(12) United States Patent
Vollenwyder et al.

(10) Patent No.: US 8,827,058 B2
(45) Date of Patent: Sep. 9, 2014

(54) INDUCTIVELY RECEIVING ELECTRIC ENERGY FOR A VEHICLE

(75) Inventors: Kurt Vollenwyder, Kingston (CA);
Jürgen Meins, Braunschweig (DE);
Carsten Struve, Münich (DE)

(73) Assignee: Bombardier Transportation GmbH, Berlin (DE)

( * ) Notice: Subject to any disclaimer, the term of this patent is extended or adjusted under 35 U.S.C. 154(b) by 475 days.

(21) Appl. No.: 13/119,850

(22) PCT Filed: Sep. 17, 2009

(86) PCT No.: PCT/EP2009/006930
§ 371 (c)(1),
(2), (4) Date: Jun. 1, 2011

(87) PCT Pub. No.: WO2010/031595
PCT Pub. Date: Mar. 25, 2010

(65) Prior Publication Data
US 2012/0055751 A1 Mar. 8, 2012

(30) Foreign Application Priority Data

Sep. 19, 2008 (GB) .................................. 0817310.6

(51) Int. Cl.
*B60L 9/00* (2006.01)
*B60L 5/00* (2006.01)
*B60L 11/18* (2006.01)
*B60M 7/00* (2006.01)

(52) U.S. Cl.
CPC ............. *B60L 5/005* (2013.01); *B60L 2200/26* (2013.01); *Y02T 90/122* (2013.01); *Y02T 10/7005* (2013.01); *Y02T 90/14* (2013.01); *B60L 11/182* (2013.01); *Y02T 10/7088* (2013.01); *Y02T 10/725* (2013.01); *B60L 2210/20* (2013.01); *Y02T 90/127* (2013.01); *B60M 7/00* (2013.01)
USPC .............................................. 191/10; 191/2

(58) Field of Classification Search
CPC ............. B60L 9/00; B60L 9/08; B60L 5/005; B60L 7/14; B60L 11/16; B60L 11/1803; B60L 2200/26; B60L 2210/20; B60L 11/182; B60L 11/1833; B60M 3/04; H01M 10/44
USPC ................................ 191/2–6, 10, 22 R, 23 R
See application file for complete search history.

(56) References Cited

U.S. PATENT DOCUMENTS

| | | | |
|---|---|---|---|
| 2,518,736 | A | 8/1950 | Wheeler |
| 3,225,351 | A | 12/1965 | Chatelain et al. |
| 3,513,338 | A | 5/1970 | Poloujadoff |
| 3,863,574 | A | 2/1975 | Thomas |

(Continued)

FOREIGN PATENT DOCUMENTS

| | | |
|---|---|---|
| DE | 1806977 | 6/1969 |
| DE | 1806977 A1 | 6/1969 |

(Continued)

OTHER PUBLICATIONS

Chen et al., "Inductive Power Transferring in Maglev Using Harmonic Injection Method", IEEE, 2004, pp. 1165-1170.

(Continued)

*Primary Examiner* — Jason C Smith
(74) *Attorney, Agent, or Firm* — The Webb Law Firm

(57) ABSTRACT

The invention relates to an arrangement for providing a vehicle, in particular a track bound vehicle, with electric energy, wherein the arrangement comprises a receiving device (200) adapted to receive an alternating electromagnetic field and to produce an alternating electric current by electromagnetic induction. The receiving device (200) comprises a plurality of windings and/or coils (9, 10, 11) of electrically conducting material, wherein each winding or coil (9, 10, 11) is adapted to produce a separate phase of the alternating electric current.

17 Claims, 17 Drawing Sheets

(56) References Cited

U.S. PATENT DOCUMENTS

| | | | | |
|---|---|---|---|---|
| 3,914,562 | A | * | 10/1975 | Bolger .............................. 191/10 |
| 4,068,152 | A | | 1/1978 | Nakamura et al. |
| 4,328,499 | A | | 5/1982 | Anderson et al. |
| 4,331,225 | A | * | 5/1982 | Bolger .............................. 191/10 |
| 4,742,283 | A | * | 5/1988 | Bolger et al. .................. 318/587 |
| 4,800,328 | A | * | 1/1989 | Bolger et al. .................. 320/106 |
| 4,836,344 | A | * | 6/1989 | Bolger .............................. 191/10 |
| 5,311,973 | A | | 5/1994 | Tseng et al. |
| 5,573,090 | A | | 11/1996 | Ross |
| 5,669,470 | A | * | 9/1997 | Ross ................................ 191/10 |
| 5,708,427 | A | | 1/1998 | Bush |
| 5,821,728 | A | * | 10/1998 | Schwind ........................ 320/108 |
| 5,898,579 | A | | 4/1999 | Boys et al. |
| 6,005,304 | A | | 12/1999 | Seelig |
| 6,089,362 | A | * | 7/2000 | Takasan et al. .................. 191/10 |
| 6,089,512 | A | | 7/2000 | Ansorge et al. |
| 6,230,861 | B1 | | 5/2001 | Cornic |
| 6,250,442 | B1 | | 6/2001 | Perraud et al. |
| 6,286,434 | B1 | | 9/2001 | Fischperer |
| 6,382,378 | B1 | | 5/2002 | Cornic |
| 6,407,470 | B1 | | 6/2002 | Seelig |
| 6,421,600 | B1 | * | 7/2002 | Ross .............................. 701/117 |
| 6,462,432 | B1 | | 10/2002 | Seelig et al. |
| 6,499,701 | B1 | | 12/2002 | Thornton et al. |
| 6,502,517 | B1 | | 1/2003 | Groening et al. |
| 6,753,666 | B2 | * | 6/2004 | Fischperer .................... 318/135 |
| 6,868,073 | B1 | | 3/2005 | Carrender |
| 6,879,889 | B2 | * | 4/2005 | Ross ................................ 701/22 |
| 6,985,107 | B2 | | 1/2006 | Anson et al. |
| 7,038,573 | B2 | | 5/2006 | Bann |
| 7,084,527 | B2 | | 8/2006 | Futschek |
| 7,116,540 | B2 | | 10/2006 | Green et al. |
| 7,243,752 | B2 | | 7/2007 | Green et al. |
| 7,276,812 | B2 | | 10/2007 | Uhl |
| 7,277,675 | B2 | | 10/2007 | Lohr et al. |
| 7,298,314 | B2 | | 11/2007 | Schantz et al. |
| 7,365,698 | B2 | | 4/2008 | Dwyer et al. |
| 7,385,363 | B2 | | 6/2008 | Schemm |
| 7,511,250 | B2 | | 3/2009 | Lindig |
| 7,518,520 | B2 | | 4/2009 | Mullins |
| 7,560,927 | B2 | | 7/2009 | Maguire et al. |
| 7,694,632 | B2 | | 4/2010 | Ellmann et al. |
| 7,825,537 | B2 | * | 11/2010 | Freer .............................. 307/42 |
| 8,360,216 | B2 | * | 1/2013 | Meins et al. .................... 191/10 |
| 2003/0105560 | A1 | | 6/2003 | Sugita et al. |
| 2003/0200025 | A1 | * | 10/2003 | Ross .............................. 701/200 |
| 2005/0161300 | A1 | | 7/2005 | Green |
| 2005/0178632 | A1 | * | 8/2005 | Ross ................................ 191/10 |
| 2006/0197939 | A1 | | 9/2006 | Baiker et al. |
| 2007/0289476 | A1 | | 12/2007 | Schemm et al. |
| 2008/0129246 | A1 | * | 6/2008 | Morita et al. .................. 320/108 |
| 2008/0316085 | A1 | | 12/2008 | Rofougaran et al. |
| 2008/0316103 | A1 | | 12/2008 | Rofougaran et al. |
| 2009/0013899 | A1 | | 1/2009 | Wolf et al. |
| 2012/0055751 | A1 | * | 3/2012 | Vollenwyder et al. ........... 191/10 |

FOREIGN PATENT DOCUMENTS

| | | |
|---|---|---|
| DE | 2310812 | 9/1973 |
| DE | 3527309 A1 | 2/1987 |
| DE | 3714263 A1 | 10/1988 |
| DE | 4115568 A1 | 2/1993 |
| DE | 4236340 A1 | 5/1994 |
| DE | 4236340 C2 | 5/1994 |
| DE | 4342319 A1 | 6/1995 |
| DE | 4429656 C1 | 4/1996 |
| DE | 4446779 A1 | 6/1996 |
| DE | 19512107 B4 | 10/1996 |
| DE | 19512523 A1 | 10/1996 |
| DE | 19735624 C1 | 12/1998 |
| DE | 19723959 A1 | 1/1999 |
| DE | 19746919 A1 | 5/1999 |
| DE | 19801586 A1 | 7/1999 |
| DE | 19856937 A1 | 6/2000 |
| DE | 20002984 U1 | 8/2000 |
| DE | 19947368 C1 | 5/2001 |
| DE | 10013767 A1 | 10/2001 |
| DE | 10026175 A1 | 7/2002 |
| DE | 10112892 A1 | 10/2002 |
| DE | 10227253 A1 | 10/2003 |
| DE | 20209092 U1 | 11/2003 |
| DE | 10225005 C1 | 12/2003 |
| DE | 10326614 A1 | 12/2004 |
| DE | 10334736 A1 | 2/2005 |
| DE | 10334737 A1 | 2/2005 |
| DE | 10346105 A1 | 4/2005 |
| DE | 10349242 B3 | 4/2005 |
| DE | 102004009896 A1 | 9/2005 |
| DE | 102004012746 A1 | 10/2005 |
| DE | 10216422 B4 | 7/2006 |
| DE | 69929353 T2 | 9/2006 |
| DE | 102006006384 A1 | 9/2006 |
| DE | 102004031580 B4 | 2/2007 |
| DE | 102006049588 A1 | 8/2007 |
| EP | 0187526 A2 | 7/1986 |
| EP | 0187527 A2 | 7/1986 |
| EP | 0289868 A2 | 11/1988 |
| EP | 0608242 B1 | 8/1994 |
| EP | 0640255 B1 | 3/1995 |
| EP | 0681939 B1 | 11/1995 |
| EP | 0761493 A1 | 3/1997 |
| EP | 0666804 B1 | 9/1997 |
| EP | 0818868 B1 | 1/1998 |
| EP | 0962353 A1 | 12/1999 |
| EP | 0979176 B1 | 2/2000 |
| EP | 1011187 A1 | 6/2000 |
| EP | 1050094 B1 | 8/2000 |
| EP | 1043187 A1 | 10/2000 |
| EP | 1043186 A1 | 11/2000 |
| EP | 1095812 A1 | 5/2001 |
| EP | 1582395 A1 | 10/2005 |
| EP | 1610450 A2 | 12/2005 |
| EP | 1744443 A1 | 1/2007 |
| GB | 638143 | 5/1950 |
| GB | 657035 | 9/1951 |
| GB | 657036 | 9/1951 |
| GB | 1280148 | 7/1972 |
| GB | 1390225 | 4/1975 |
| GB | 2236957 A | 4/1991 |
| GB | 2399465 A | 9/2004 |
| GB | 2461577 A | 1/2010 |
| GB | 2463692 A | 3/2010 |
| GB | 2463693 A | 3/2010 |
| JP | 5843104 A | 3/1983 |
| JP | 58043104 A | 3/1983 |
| JP | 6376505 U | 5/1988 |
| WO | 9101232 A1 | 2/1991 |
| WO | 9217929 A1 | 10/1992 |
| WO | 9323908 A1 | 11/1993 |
| WO | 9323909 A1 | 11/1993 |
| WO | 9425304 A1 | 11/1994 |
| WO | 9511544 A1 | 4/1995 |
| WO | 9511545 A1 | 4/1995 |
| WO | 9530556 A2 | 11/1995 |
| WO | 9823017 A1 | 5/1998 |
| WO | 9908359 A1 | 2/1999 |
| WO | 0118936 A1 | 3/2001 |
| WO | 0171882 A1 | 9/2001 |
| WO | 0235676 A1 | 5/2002 |
| WO | 03052900 A2 | 6/2003 |
| WO | 03095282 A2 | 11/2003 |
| WO | 2004030975 A2 | 4/2004 |
| WO | 2004105226 A1 | 12/2004 |
| WO | 2007126321 A1 | 11/2007 |
| WO | 2009007666 A1 | 1/2009 |
| WO | 2009127938 A2 | 10/2009 |
| WO | 2010031596 A2 | 3/2010 |
| WO | 2010033584 A2 | 3/2010 |

OTHER PUBLICATIONS

Kazimierczuk et al., "Class-E Amplifier with an Inductive Impedance Inverter", IEEE Transactions on Industrial Electronics, Apr. 1990, pp. 160-166, vol. 37, No. 2.

(56) References Cited

OTHER PUBLICATIONS

Green et al., "10 kHz Inductively Coupled Power Transfer—Concept and Control", IEEEPower Electronics and Variable-Speed Drives, Oct. 1994, pp. 694-699, Conference Publication No. 399.

"Microgrid Powered Electric Vehicles: Wireless Energy Transfer Technology", Energy Transport Technologies, http://ettek.com/images/TechWeb.pdf, published online by at least Dec. 17, 2007, pp. 1-14.

Sato et al., "A New Meander Type Contactless Power Transmission System—Active Excitation with a Characteristics of Coil Shape", IEEE Transactions on Magnetics, Jul. 1998, pp. 2069-2071, vol. 34, No. 4.

Meins et al., "Contactless High Power Supply", Sixth International Conference on Unconventional Electromechanical and Electrical Systems, Sep. 24-28, 2004, vol. 2, 7 pages.

Covic et al., "A Three-Phase Inductive Power Transfer System for Roadway-Powered Vehicles", IEEE Transactions on Industrial Electronics, Dec. 2007, pp. 3370-3378, vol. 54, No. 6.

\* cited by examiner

Fig. 14
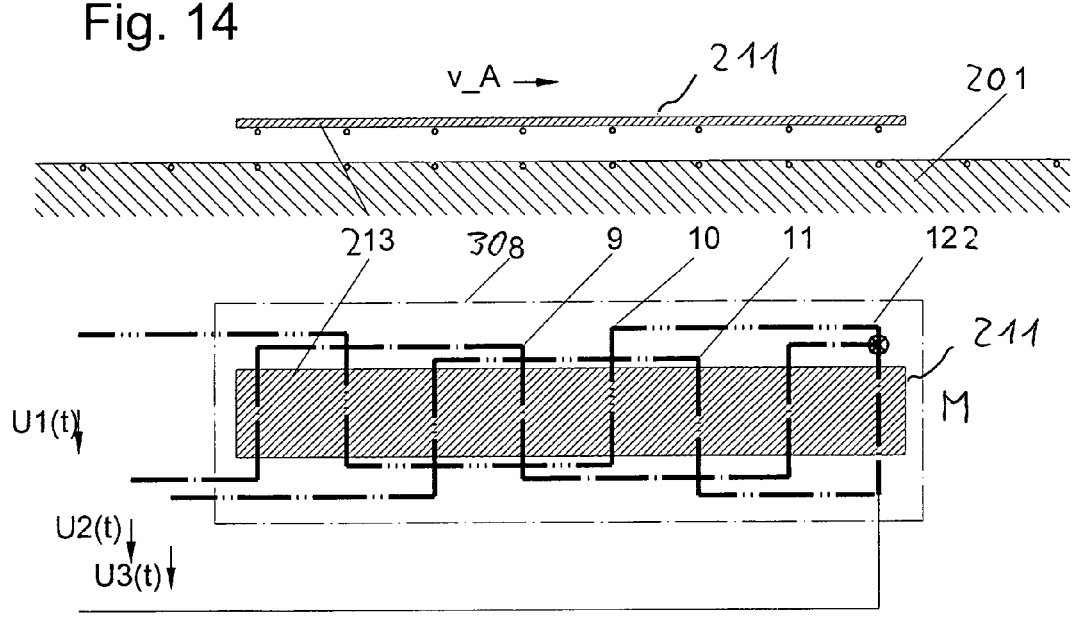
Fig. 15
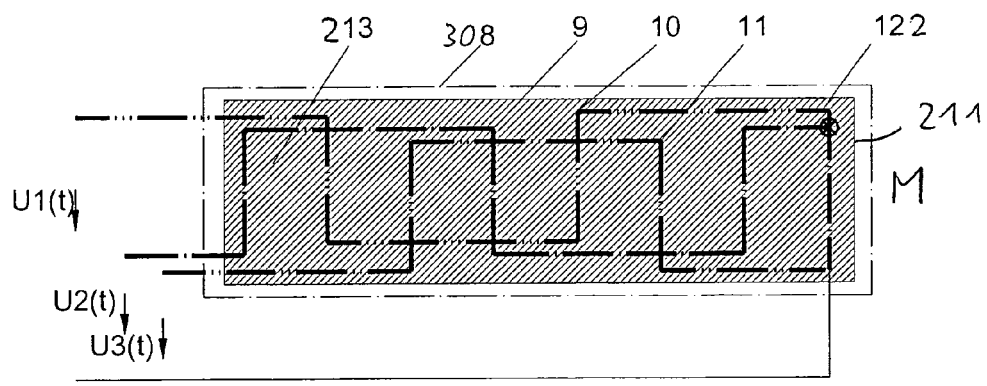
Fig. 16

INDUCTIVELY RECEIVING ELECTRIC ENERGY FOR A VEHICLE

BACKGROUND OF THE INVENTION

1. Field or the Invention

The invention relates to an arrangement, a system and a method for providing a vehicle, in particular a track bound vehicle, with electric energy by using a receiving device adapted to receive an alternating electromagnetic field and to produce an alternating electric current by electromagnetic induction. In particular, the invention is applicable for providing light rail vehicles (e.g. a tram) with energy for propulsion.

2. Description of Related Art

In particular track bound vehicles, such as conventional rail vehicles, mono-rail vehicles, trolley busses and vehicles which are guided on a track by other means, such as other mechanical means, magnetic means, electronic means and/or optical means, require electric energy for propulsion on the track and for operating auxiliary systems, which do not produce traction of the vehicle. Such auxiliary systems are, for example, lighting systems, heating and/or air condition system, the air ventilation and passenger information systems. However, more particularly speaking, the present invention is related to transferring electric energy to a vehicle which is not necessarily (but preferably) a track bound vehicle. Generally speaking, the vehicle may be, for example, a vehicle having an electrically operated propulsion motor. The vehicle may also be a vehicle having a hybrid propulsion system, e.g. a system which can be operated by electric energy or by other energy, such as electrochemically stored energy or fuel (e.g. natural gas, gasoline or petrol).

Track bound vehicles, in particular vehicles for public passenger transport, usually comprise a contactor for mechanically and electrically contacting a line conductor along the track, such as an electric rail or an overhead line. At least one propulsion motor on board the vehicles is fed with the electrical power from the external track or line and produces mechanic propulsion energy.

Trams and other local or regional trains are operated usually via overhead power lines within cities. However, especially in historic parts of cities, overhead power lines are undesirable. On the other hand, conductor rails in the ground or near the ground cause safety problems.

WO 95/30556 A2 describes a road way-powered electric vehicle system. The all-electric vehicle has one or more on-board energy storage elements or devices that can be rapidly charged or energized with energy obtained from an electrical current, such as a network of electromechanical batteries. The energy storage elements may be charged while the vehicle is in operation. The charging occurs through a network of power coupling elements, e.g. coils embedded in the road way. Inductive heating coils are located at passenger loading/unloading zones in order to increase passenger safety.

Placing the coils at selected locations along the length of the roadway has the disadvantage that the energy storage on board the vehicle needs a large storage capacity. In addition, if the vehicle does not reach the next coil in time, the vehicle might run out of energy for propulsion or other purposes. Therefore, at least for some applications, it is preferred to transfer energy to the vehicle continuously along the path of travel, i.e. along the track.

Inductively transferring energy from the track to the vehicle, i.e. producing electromagnetic fields, is subject to restrictions regarding EMC (electromagnetic compatibility). On one hand, electromagnetic fields may interfere with other technical devices. On the other hand, people and animals should not be subjected to electromagnetic fields permanently. At least, the respective limit values for field intensity must be observed.

As principally disclosed in WO 95/30556 A2, the vehicle which is travelling on the track may comprise a coil and the electromagnetic field generates an electric alternating voltage in the coil which can be used to operate any electric load in the vehicle, such as a propulsion motor, or can be used to charge an energy storage system, such as conventional batteries and/or super caps.

SUMMARY OF THE INVENTION

The present invention is an arrangement, a system and method for providing a vehicle, in particular a track bound vehicle, with electric energy in an effective manner. In particular, a high-power density shall be produced by the receiving device in the vehicle. Furthermore, fluctuations of the alternating current or voltage within the vehicle shall be reduced. Preferably, the field intensity in the environment of a receiving device within the vehicle shall be low.

According to a basic aspect of the present invention energy is transferred from an electric conductor arrangement, which is arranged along the path of travel (e.g. a track of a track bound vehicle) and which is not moving while the vehicle is traveling, to the vehicle. The conductor arrangement carries an alternating current which generates a respective electromagnetic field and the electromagnetic field is used to transfer the electric energy to the vehicle.

Preferably, the conductor arrangement is located in and/or under the track, in particular under the surface of the ground on which the vehicle travels. However, the invention also includes the case that at least a part of the conductor arrangement is located sideways of the track, for example when the track is located in the country side or in a tunnel.

The frequency of the alternating current which flows through the conductor arrangement may be a high frequency in the range of 1-100 kHz, in particular in the range of 10-30 kHz, preferably about 20 kHz. However, other frequencies are also possible.

The principle of transferring the energy by electromagnetic fields has the advantage that the conductor arrangement can be electrically insulated against contact. For example the wires or lines of the conductor arrangement can be buried in the ground. No pedestrian may unintentionally contact the buried lines. Furthermore, the problem of wear and tear of contactors, which are used to contact standard overhead lines or live rails, is solved.

However, using a single coil (as disclosed in WO 95/30556 A2) causes severe fluctuations of the amplitudes of the alternating current or alternating voltage produced by the coil. One reason is that the field intensity of the received electromagnetic field may vary while the vehicle is travelling. Furthermore, the power density of a single coil is low and the alternating current which is produced by the coil causes secondary electromagnetic fields.

Therefore, it is proposed to use a receiving device within the vehicle which produces an alternating electric current having a plurality of phases.

In particular, the following is proposed: An arrangement for providing a vehicle, in particular a track bound vehicle, with electric energy, wherein the arrangement comprises a receiving device adapted to receive an alternating electromagnetic field and to produce an alternating electric current by electromagnetic induction, wherein the receiving device comprises a plurality of windings and/or coils of electrically conducting material, wherein each winding or coil is adapted to produce a separate phase of the alternating electric current.

Furthermore, an arrangement is proposed for providing a vehicle, in particular a track bound vehicle, with electric energy, wherein the arrangement comprises a receiving device adapted to receive an alternating electromagnetic field and to produce an alternating electric current by electromagnetic induction, wherein the receiving device comprises a plurality of windings and/or coils of electrically conducting material, wherein the windings and/or coils are adapted to produce different phases of the alternating current and are positioned at different positions in the travelling direction of the vehicle. While the vehicle is travelling the different windings or coils may receive an electromagnetic field of different intensity, but the total power produced by the windings or coils is less dependent on time, since a decreasing power of one winding or coil can be compensated by a higher power of another winding or coil. Because the windings or coils are located at different positions, the power depends on the average intensity of the electromagnetic field in the area, which is covered by the windings or coils.

According to a specific embodiment, the receiving area (i.e. the area which receives the magnetic flux that causes the alternating voltage in the windings and/or coils) of different windings and/or coils may overlap each other. Examples are shown in the attached figures and will be described below. More generally speaking, the different phases of the windings and/or coils may part of a single unit. Such a unit may have a housing wherein the windings and/or coils are located within the housing. In addition, a vehicle may have more than one of the units at different positions in travel direction.

Another advantage of a receiving device having a plurality of phases is that the electromagnetic fields which are produced by the phases at least partially compensate each other. Therefore, the energy can be transferred to the vehicle at higher power densities without exceeding the EMC limits or, alternatively, the field intensities can be reduced. Furthermore, the power density which can be achieved by a receiving device having plural phases is higher than for a single phase.

Although it is true that a single coil having a large number of windings may produce a large alternating current or voltage, such a coil is not desired since it would require a significant dimension in a direction extending transversely to the direction of travel. Consequently, the average distance of the windings to the source of the electromagnetic field (which may be integrated in the sleepers of a railway for example) is high. In contrast, the receiving device according to the present invention can be arranged in such a manner that the windings of the different phases are distributed over a larger area and, therefore, the required dimension transversely to the direction of travel is smaller.

A coil is understood to have a plurality of windings which are connected in series or in parallel to each other.

Preferably, the different phases of the alternating current or voltage which are produced by the windings or coils are connected in such a manner and/or are combined with further elements and/or devices of the electricity system of the vehicle that a single direct current is produced. For example, as will be described in more detail later, each phase can be connected to an AC/DC converter (i.e. a converter which converts the alternating current produce by the receiving device into a direct current) and the DC sides of the converters can be connected in series and/or in parallel to each other. However, it is also possible to connect some or all phases to the same AC/DC converter. The phases may constitute a star point circuit (i.e. the different windings and/or coils are connected to a common star point). The opposite ends of the windings or coils may be connected to the load.

Preferably, the windings and/or coils of the receiving device are positioned only a few centimeters above the primary side conductor arrangement, because the magnetic coupling between primary and secondary coils will decrease with increasing distance. E.g., the windings and/or coils are positioned not more than 10 cm above the ground (in the special case of a rail vehicle, ground level is defined by the underside of the wheels which is also the level of the surface at the upper side of the rails), preferably not more than 7 cm and most preferred 2-3 cm above the ground. The line or lines of the non-movable conductor arrangement may be located not more than 20 cm below the surface of the ground, preferably not more than 10 cm. However, especially the transversely extending sections may be located within the sleepers of a railway or more generally speaking above ground. In this case the distance to the receiving device is reduced.

Preferably, the receiving device which receives the transferred energy is movable in vertical direction so that it can be brought in a position closely above ground and it can be lifted into a higher position when the receiving device is not used.

Preferably, as will be described in more detail below, the electromagnetic field which is transferred to the vehicle for the purpose of energy supply is propagating as a wave which moves in or opposite to the direction of travel. If the velocity of the wave is much faster than the traveling velocity of the vehicle (for example at least 10 times faster), the power which can be produced by the individual coils or windings of the receiving device fluctuates at a high frequency (in the example at least 10 Hz). Therefore, each coil or winding can produce a nearly constant power if the average value over a time interval of some seconds is considered. Such fluctuations can be handled easily (if necessary at all), for example by using an AC/DC converter and a smoothing capacitor on the DC side.

The alternating electromagnetic field (in the following: the primary electromagnetic field) which is received by the windings and/or coils induces secondary alternating currents or voltages in the windings and/or coils of the receiving device. In turn, these alternating currents produce an alternating electromagnetic field (in the following: the secondary electromagnetic field). If the primary electromagnetic field has different field strength at different locations of the receiving device and, preferably, has at least two different magnetic poles (one north pole and one south pole) within the lengthwise extension (in the direction of travel) electric currents having opposite directions can be produced at different locations of the receiving device at each point in time. For example, the primary electromagnetic field may be produced by the lines of a plurality of phases of an alternating current conductor arrangement, wherein each phase has sections extending transversely to the direction of travel (this will be described in more detail below). In this case, it is preferred that the phases of the receiving device also have line sections which are extending transversely to the direction of travel. Furthermore, the pole distance (which is defined by the distance of the transversely extending sections, provided that the currents through consecutive sections of different phases are oriented opposite to each other) may be the same or may be in the same order of magnitude on the primary side and on the secondary side (i.e. within the receiving device). If the pole distance is nearly the same, the magnetic poles of the primary electromagnetic field produce currents in the transversely extending sections of the receiving device which are flowing in opposite directions, provided that the distance between the primary side and the secondary side is not too large (otherwise, the field intensity will become too small, i.e. the coupling becomes ineffective). In practice, this distance may be in the range of some centimeters, e.g. in the range of 5 to 10 cm. The distance is considered not too large, if the pole distance is not larger than 10 times the distance of the lines on the primary side and the lines on the secondary side, preferably, not larger than 5 times. On the other hand, it does not improve the coupling between the primary and secondary side significantly if the pole distance becomes larger than the distance between the lines on the primary side and the lines on the secondary side.

Preferably, a body comprising a ferromagnetic material is arranged above the windings and/or coils which are located in and/or on the vehicle. Typically, the body may consist of the material which may be a homogeneous material so that no magnetic poles are formed within the material. The body may have the shape of a slab or plate.

The ferromagnetic body increases the magnetic flux density and by that the output power of the receiving device and in addition the side of the body which is opposite to the windings or coils is kept (nearly) free of electromagnetic fields produced by the windings/coils. As preferred, this opposite side may be the top side and the receiving device may be located at the bottom of the vehicle or below the vehicle so that the field intensity within the vehicle is small.

In order to further increase the output power of the receiving device, the windings and/or coils may comprise sections, which extend transversely to the direction of travel of the vehicle and which extend substantially in a common plane (preferably a horizontal plane). It is preferred that these sections are distributed—in the direction of travel—along a length which has the same size as a projection of the surface area of the body onto the plane, wherein the windings and/or coils are distributed throughout the whole length. This means that the full length, which is covered by the ferromagnetic body, is used by the windings and/or coils. Consequently, the area of windings or coils which is covered by the body and which receives the magnetic flux is maximized.

The lateral ends (lateral means in a direction transverse to the travel direction) of these sections are usually called "heads" or "coil heads". It is preferred to have the heads covered by the ferromagnetic body. On the other hand, it is preferred that the heads extend to the lateral limits of the area which is covered by the body. In other words, it is preferred that the sections extend within the limits of a width which is the width of an area which has the same size as a projection of the surface area of the body onto the plane.

Again, this will increase the output power (i.e. the magnetic coupling to the conductor arrangement which produces the electromagnetic field is improved) of the receiving device and the body still shields the opposite side from electromagnetic fields of the coils and/or windings.

According to a specific embodiment, at least one of the phases of the receiving device comprises two or more parallel conductors (i.e. lines, wherein each of the lines comprises a winding or a coil) which are electrically connected in parallel to each other. This means that both conductors produce an alternating current if an alternating magnetic flux is present in the winding or coil. However, since the two lines do not exactly follow the same path, the alternating voltages produced by the lines are slightly different. These differences would result in a partial compensation of the current and the effective power would be reduced. Therefore, it is proposed to connect the lines to the electric load in the vehicle via a differential current transformer for eliminating any differential current of the two parallel lines. For example, the differential current transformer may be realised by a ring of ferromagnetic material and a first of the lines extends through the ring from a first side to a second side and the second line extends through the ring from the second side to the first side, i.e. in opposite direction compared to the first line. More generally speaking, the differential current transformer is adapted in a manner that the magnetic fields produced by the two lines are directed in opposite direction within the transformer and the transformer couples these magnetic fields so that any differential current is eliminated or prevented. Therefore, the differential current transformer removes any differential current in the parallel lines so that the usable power is increased.

A capacity (e.g. one capacitor or an arrangement having more than one capacitor) may be connected in series or in parallel to each of the windings and/or coils to compensate the inductance of the windings and/or coils.

If the capacities are connected in series to the windings and/or coils, an alternating current having a constant amplitude, which produces the electromagnetic field in the conductor arrangement along the path of travel (e.g. the conductor arrangement in the railway) causes an alternating voltage having a constant amplitude in the windings and/or coils. The capacity of a specific phase may be divided in partial capacities (e.g. a plurality of individual capacitors) and the partial capacities may be distributed among sections of the phases so that each capacity compensates the inductivity of the section. In practice, the line (which is bent or wound to produce a winding or a coil) may comprise at least one capacitor. If at least two capacitors are arranged within the line, they are preferably located at different positions in the course of the line. The same may apply to the lines of the primary side conductor arrangement.

If the capacities are connected in parallel to the windings and/or coils, an alternating current having a constant amplitude, which produces the electromagnetic field in the conductor arrangement along the path of travel, causes an alternating current having a constant amplitude in the windings and/or coils. On the other hand, if the capacities are connected in parallel to the windings and/or coils and if an alternating voltage having a constant amplitude is used to produce the electromagnetic field along the path of travel, an alternating voltage having a constant amplitude is produced by the windings and/or coils.

Either an alternating current with constant amplitude or an alternating voltage with constant amplitude can be desirable, depending on the constitution of the electric power supply system within the vehicle.

In all the cases mentioned before, the capacities are chosen to compensate the inductivities of the windings and/or coils to produce a resulting impedance of (approximately) zero in case of a series connection or infinite in case of parallel connection.

Each of the windings and/or coils may be connected to an AC/DC converter to produce a direct current and the AC/DC converters may be connected in such a manner that the voltages on the DC sides of the converters are added to each other to produce a sum voltage usable for supplying electric energy to a consumer within the vehicle. For example, each of the converters may have a bridge consisting of two diodes, wherein a terminal of the winding and/or a coil is connected to a connecting line between the diodes. The bridges of the different converters may be connected in series to each other, in this case.

According to an alternative solution, terminals of at least some of the windings and/or coils are connected—for each winding or coil separately—to an AC/DC converter for producing a direct current and the converters are electrically connected in parallel to each other so that the direct currents produced by the converters are added to each other for supplying electric energy to a consumer within the vehicle.

In the cases described in the two preceding paragraphs, the performance of the circuit is not adversely affected by any non-symmetric behaviour of the different phases, i.e. the alternating voltages or alternating currents produced by the different phases do not compensate each other. Non-symmetric behaviour means that the different phases produce alternating voltages or alternating currents of different amplitudes, for example due to different orientation of the winding or coil or due to different sizes of the effective area for receiving the magnetic flux of the electromagnetic field, even if the average magnetic flux is the same at each winding or coil.

A capacity may be connected between the direct current terminals of the converter or converters. Such a capacity smoothes fluctuations of the direct voltage on the DC side of the converter(s). In particular if the capacity is a super cap or an arrangement of super caps, it can be used as an energy storage of the energy supply system of the vehicle.

Preferably, a switch is connected in parallel to the capacity and the arrangement comprises a control device adapted to automatically close the switch if the capacity is fully loaded with electric energy and thereby shortening the DC side of the converters and adapted to automatically open the switch if the capacity is able to receive electric energy from the windings and/or coils. The fully loaded state may be detected by measuring the voltage across the capacity. A specific value of the voltage may be predefined which corresponds to the fully loaded state. A diode or another one way valve may be connected in series to the switch so that the capacity cannot be shortened.

The invention includes a system for transferring the energy to the vehicle, wherein the system comprises the conductor arrangement which produces the electromagnetic field along the path of travel and also comprises the arrangement with the receiving device within the vehicle or on the vehicle. Furthermore, the invention includes a vehicle with the receiving device and a method of operating the system, the receiving device and/or the vehicle. A method of manufacturing the system, the receiving device and/or the vehicle is also included in the invention.

The non-movable part of the system for transferring electric energy to the vehicle may have the following features:
the system comprises a (non-movable) electric conductor arrangement for producing an electromagnetic field and for thereby transferring the energy to the vehicle,
the electric conductor arrangement comprises at least two lines for carrying (in each case) one phase of an alternating current,
the lines extend along the track,
the lines are arranged in such a manner that each line produces—at each point in time while the alternating electric current is flowing through the line—a row of successive magnetic poles of an electromagnetic field, wherein the successive magnetic poles have alternating magnetic polarities,
the row of successive magnetic poles extends in the travel direction of the vehicle which is defined by the track.

Alternatively, the system may be defined by the following features:
the system comprises an electric conductor arrangement
the electric conductor arrangement comprises at least two lines for carrying (in each case) one phase of an alternating current,
the lines extend along the track,
the lines comprise a plurality of sections which extend transversely to the travel direction of the vehicle which is defined by the track,
the sections of the same line are arranged in a row along the track in such a manner that—at each point in time while an alternating electric current is flowing through the line—the alternating current flows through successive sections in the row alternatingly in opposite directions A corresponding method for transferring energy to the vehicle comprises the following features:
an electromagnetic field is produced by an electric conductor arrangement located along the track thereby transferring the energy to the vehicle,
the electromagnetic field is produced by conducting at least the phase current of two phases of an alternating current in lines of the electric conductor arrangement,
the phase currents are conducted along the track in the lines in such a manner that—at each point in time while the phase currents are flowing through the lines—the phase currents flow transversely to the travel direction of the vehicle through a plurality of sections of the respective line, wherein the phase currents flow through a first group of the sections in a first direction and flow through a second group of the sections in the opposite direction and wherein the sections of the first group and of the second group of the same phase alternate in the direction of travel.

The electric conductor arrangement comprises at least two lines as mentioned above. Preferably, it comprises more than two of these lines, wherein each line is adapted to carry one phase of a multi-phase alternating current. In practice, it is preferred that the electric conductor arrangement comprises three lines and that each line is adapted to carry one of the three phases of a three-phase alternating current. However, it is also possible, that there are more than three-phases carried by a corresponding number of lines. The magnetic poles produced by the lines and/or the sections of the different lines are—at each point in time—in a repeating sequence extending in the travel direction, wherein the repeating sequence corresponds to a sequence of the phases. For example in the case of a three-phase alternating current, having the phases U, V, W, a section carrying phase U is followed by a section carrying phase V which in turn is followed by a section carrying phase W and this sequence of phases U, V, W is repeated several times in the direction of the track, i.e. in the travel direction. An example will be described later with reference to the attached figures.

Each of the at least two lines produces—at each point in time while the alternating electric current is flowing through the line—a row of successive magnetic poles of an electromagnetic field, wherein the successive magnetic poles have alternating magnetic polarities. In other words: At a given point in time the alternating current in the line produces—in the direction of travel—a magnetic field having a magnetic field vector which is oriented in a first direction in a first region of the line, followed by a second region of the line where the field vector of the magnetic field is oriented in the opposite direction of the first direction, followed by another region of the line where the magnetic field vector is oriented again in the first direction and so on. However, it is not always the case that the first direction and the direction of the magnetic field vector in the following region of the line are exactly oriented in opposite direction. One reason may be that the line is not arranged exactly in a regular, repeating manner. Another reason may be non-symmetrical influences of other lines of the conductor arrangement. A further reason may be external electromagnetic fields. Also, the vehicle which is travelling on the track will influence the resulting electromagnetic field.

However, the principle of alternating magnetic poles produced by the same line of the conductor arrangement at each point in time has the advantage that the resulting electromagnetic field strength sideways of the conductor arrangement has a very small intensity which decreases rapidly with increasing distance to the conductor arrangement. In other words, the oppositely oriented magnetic fields in the regions of the line are superimposed sideways of the line and compensate each other. Since it is desirable to have very small electromagnetic field strength on both sides of the track, it is preferred that the at least one line of the electric conductor arrangement is located in and/or under the track wherein the sections of the line which extend transversely to travel direction extend in a horizontal plane. In this context, "horizontal" also covers the case that the track may form a bent and is slightly inclined. Correspondingly the respective "horizontal" plane of the line sections may also be inclined slightly. Horizontal is therefore referred to the standard case that the track is extending in a horizontal plane. The same applies to the case that the track is leading upwardly onto a hill or downwardly from the hill. Some percentages of inclination of the track are negligible for the compensation of the magnetic fields sideways of the track.

Since the field intensity sideways of the track is very small, energy can be transferred to the vehicle at high power and EMC limit values (e.g. 5 uT for the sideways magnetic field intensity) can be met easily at the same time.

According to a particularly preferred embodiment, each of the lines of the electric conductor arrangement extends along the track in a serpentine manner, i.e. sections of the line which extend in the direction of travel are followed in each case by a section which extends transversely to the travel direction which in turn is followed again by a section which extends in the direction of travel. The lines may be realized by cables.

The expression "serpentine" covers lines having a curved configuration and/or having straight sections with sharply bent transition zones to neighbouring sections (which extend in travel direction). Straight sections are preferred, since they produce more homogenous fields.

In particular, the plural-phase alternating current in the lines of the conductor arrangement produces an electromagnetic wave which moves in or opposite to the direction of travel with a velocity proportional to the distance of consecutive magnetic poles of the line and proportional to the frequency of the alternating current. Preferably, at least some of the sections which extend transversely to the travel direction, and preferably all of these sections, extend over a width which is greater than the width of a receiving device of a vehicle on the track for receiving the transferred energy. For example, the width of the sections may be greater than maximum width of the vehicles which may occupy the track.

One advantage of the embodiment is that the alternating current which flows through the sections produces a nearly homogenous intensity of the magnetic field in the region where the receiving device may be located.

A further embodiment of the system or method of the present invention guarantees that the alternating magnetic field intensity is constant over time. To achieve this goal, the lines are connected to an AC (alternating current) constant-current source which is adapted to feed the lines with an alternating current, the mean value of which is constant (or nearly constant) independently of the power which is transferred from the electric conductor arrangement to the vehicle or to the vehicles on the track.

According to a preferred embodiment of the AC constant-current source, it comprises an electrical arrangement which transforms AC voltage to AC current. This electrical arrangement may comprise—in each line—an input inductivity at an input side of the constant-current source and an output inductivity at an output side of the constant-current source, wherein the input side is connected to a voltage source, wherein the output side is connected to line sections along the track, wherein each line comprises a connection point between the input side and the output side and wherein each connection point is connected to a common same star point via a capacity.

If only one vehicle or power collector is powered by the primary side power source (which is feeding the conductor arrangement) at a time, a constant AC voltage can be applied to the track side electric conductor arrangement alternatively. Because of the presence of one vehicle only, any interferences of load distribution are avoided. In this case, the AC current through the conductor arrangement (which is caused by the constant AC voltage supply) depends on the load strength. Therefore, the electrical losses of the primary side electric conductor arrangement are load dependent and the current is not constant, as in the case (described above) of a constant AC current supply.

The energy source (or power source) may be (this also applies to other embodiments of the system) a conventional inverter for producing an AC voltage from a constant DC voltage.

Preferably, the electric conductor arrangement is located under the track, e.g. under ground.

According to one embodiment, the lines of the multi-phase conductor arrangement are connected at a star point, i.e. the lines are connected to each other at a connection point which is common to all phases. Such a star point configuration is particularly easy to realize and ensures that the behaviour of the plural phases is symmetric, i.e. that all phases carry the same effective current, although—of course—there is a phase shift between the phases. For example in the case of a three-phase system, the phase shift is 120°, as usual. The alternating current in each phase may be a sinusoidal or nearly sinusoidal current. An additional advantage of a star point connection is that no backward conductor to the power source is required. All connections of the conductor arrangement to the power supply system can be made in the same section of the track.

The at least one line comprises an inductivity which is used to transfer the electric energy to the vehicle or vehicles and further comprises a leakage inductivity which does not contribute to the energy transfer to the vehicle or vehicles, wherein the inductivity is compensated by a capacity or capacities located in the same line so that the resulting impedance of the capacity and the inductivity is zero. Such a zero impedance has the advantage that the reactive power of the system is minimized and, therefore, the design of the active power components is minimized as well.

Preferably, at least one line (and preferably all of the lines) of the electric conductor arrangement comprises a plurality of line segments, wherein each line segment extends along a different section of the track and can be switched on and off separately of the other line segments. Each line segment usually comprises a plurality of the sections which extend transversely to the travel direction.

Correspondingly, an embodiment of the method comprises the step that line segments are switched on and off independently of the other line segments, so that vehicles at sections of the track, which are occupied by the vehicle, are provided with energy from the electric conductor arrangement and so that line segments along at least some sections of the track, which are not occupied by a vehicle, are switched off. As a result, losses during the operation of the system are reduced. Furthermore, EMC requirements can be met more easily, since unnecessary electromagnetic fields are avoided.

It is particularly preferred that the sections of the track are shorter than the length of a vehicle on the track in the travel direction and that the system is adapted to operate (and in particular, to switch on) line segments only if a vehicle is occupying the respective section of the track where the line segment is located. Since only line segments under (or in some cases like in tunnels sideways of) the track are switched on, the vehicle shields the environment from the electromagnetic field which is produced by the conductor arrangement. Preferably, only segments are operated which are fully occupied by a vehicle, i.e.—in lengthwise direction along the path of travel—the operated segments do not extend beyond the front of the vehicle and do not extend beyond the end of the vehicle.

The switching process may be controlled using the line segments which are switched off. Preferably, the occupation of a respective section of the track by a vehicle may be detected, in particular by detecting a voltage and/or a current in the line segment which is caused by inductive coupling of the vehicle to the line segment and/or which is caused by electromagnetic fields produced by the vehicle. Correspondingly, a measurement device may be connected to at least one of the line segments. Preferably, a plurality of or all of the line segments is connected to a measurement device and/or to the same measurement device. The measurement device or devices is/are adapted to detect the occupation of the respective section of the track by a vehicle by detecting a voltage and/or a current in the line segment which is caused by inductive coupling of the vehicle to the line segment and/or which is caused by electromagnetic fields produced by the vehicle.

The system may be adapted to switch on a line segment before a receiving device of a vehicle for receiving the transferred energy enters the section of the track where the line segment is located.

For example, the length of the line segments may be dimensioned in such a manner, that at least two of the line segments are covered lengthwise by a vehicle on the track, i.e. the minimum length of a vehicle on the track is twice as long as the length of one line segment (preferably, all line segments have the same length). As a result, the receiving device or receiving devices of the vehicle for receiving the transferred energy may be located in the middle section of the vehicle in lengthwise direction. Furthermore, it is preferred that only line segments are switched on, which are fully covered by a vehicle on the track. On the other hand, the event that a vehicle is entering the region above a particular line segment can be detected (as mentioned above) and this line segment is switched on, as soon as the vehicle enters the region above the next following line segment.

Accordingly, line segments are switched off before the vehicle leaves the region above the line segment. Preferably they are switched off before they are no longer fully covered by the vehicle.

If the conductor arrangement comprises more than one line, detecting the events that the vehicle enters or leaves a particular line segment, can be performed using one of the lines only. However, the other lines can be switched on and off correspondingly, i.e. the conductor arrangement comprises sections, wherein all lines in other sections can be switched on and off together.

BRIEF DESCRIPTION OF THE DRAWINGS

Embodiments and examples of the present invention will now be described with reference to the attached figures. The figures show.

DESCRIPTION OF THE PREFERRED EMBODIMENTS

Figure 1:
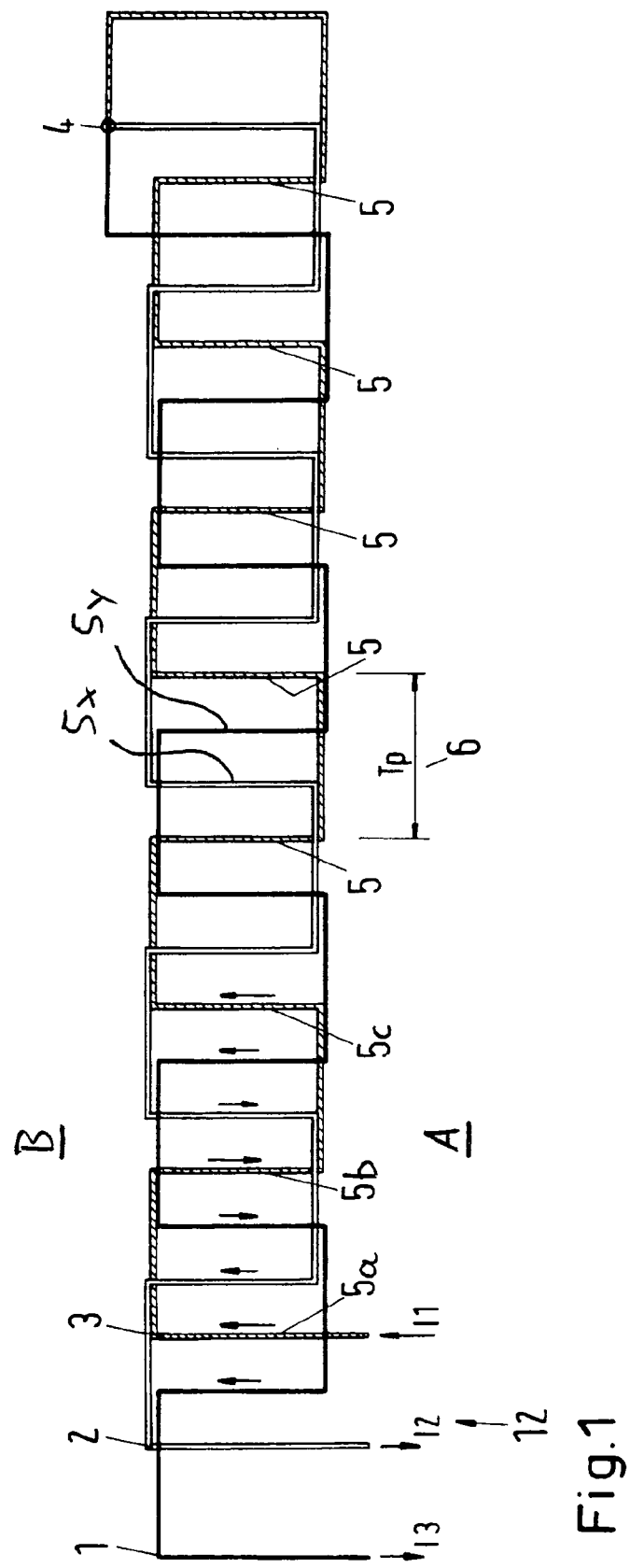
FIG. 1 schematically a three-phase conductor arrangement which extends along a track, FIG. 2 a diagram showing alternating currents through the three-phases of the arrangement according to FIG. 1 as functions of time, FIG. 3 magnetic field lines of a magnetic field, which is produced by the conductor arrangement according to FIG. 1, while a receiving device of a vehicle is located above the shown region of the conductor arrangement, wherein the direction of travel of the magnetic field distribution extends in the plane of the figure from right to left or from left to right, FIG. 4 another diagram showing a region of the magnetic field which is produced by the conductor arrangement, while a load is connected to the receiving device in the vehicle, FIG. 5 a diagram showing schematically the movement of the magnetic wave produced by the conductor arrangement along the track and showing the movement of the receiving device due to the movement of the vehicle on the track, FIG. 6 a schematic circuit diagram of the conductor arrangement according to FIG. 1 which is connected to an AC voltage source via an electrical arrangement which is transforming a voltage of the source into a constant alternating current which is fed into the conductor arrangement, FIG. 7 a circuit diagram showing a receiving device of a vehicle having coils for three different phases, wherein the receiving device is connected to an AC/DC-converter, FIG. 8 a rail vehicle which is travelling on a track along which a conductor arrangement extends, FIG. 9a-c three consecutive points in time of a situation in which a rail vehicle travels on a track, wherein the track is provided with a plurality of consecutive line segments of a conductor arrangement, wherein the line segments can be switched on and off for providing the vehicle with energy, FIG. 10 an arrangement similar to the arrangement shown in FIG. 8 including a circuit diagram of a conductor arrangement along the track, wherein the conductor arrangement comprises line segments which can be switched on and off, FIG. 11 an arrangement similar to the arrangement shown in FIG. 1, schematically illustrating a conductor arrangement between two rails of a railway, FIG. 12 a magnetic field wave which is moving in the direction of travel of the vehicle at a speed of v_M, FIG. 13 a schematic view of a receiving device having windings or coils for producing three phases of an alternating current, FIG. 14 a side view of the receiving device with a layer comprising the windings or coils and with a ferromagnetic slab on top of the layer, FIG. 15 a top view showing schematically the coils or windings of FIG. 13 and FIG. 14 and the position of the ferromagnetic slab, FIG. 16 an alternative solution of the arrangement shown in FIG. 15, wherein the ferromagnetic slab fully covers the area of the coils or windings, FIG. 17 a variant of the arrangement shown in FIG. 16, wherein the whole area which is covered by the ferromagnetic slab is used by coils, FIG. 18 schematically an alternative solution of the receiving device, wherein each phase of the windings or coils comprises two parallel lines and wherein any non-symmetrical behaviour of the parallel lines is eliminated by a differential current transformer for each phase, FIG. 19 schematically a detail of the arrangement shown in FIG. 18, showing a differential current transformer and the two lines of a phase, FIG. 20 schematically the three phases of the receiving device, wherein a capacity is connected in series to the inductivities of each phase, FIG. 21 schematically the receiving device, wherein a capacity is connected in parallel to the inductivities of each phase, FIG. 22 an arrangement similar to that shown in FIG. 20, however, the three phases are not connected to each other at a star point connection, but constitute a delta connection, FIG. 23 the arrangement shown in FIG. 20, however, the capacities are divided and distributed among each phase, FIG. 24 a receiving device with three phases, wherein the alternating currents of the phases are converted into direct currents and the resulting converted direct voltages are added to each other and the sum voltage can be used to drive any electric load within the vehicle, FIG. 25 a receiving device, wherein the alternating currents produced by the three phases of the receiving device are converted into a direct current and the direct currents are added to form a total current, FIG. 26 an arrangement comprising the receiving device of FIG. 25, wherein an energy storage is connected to the receiving device and wherein the arrangement is adapted to interrupt the process of loading the energy storage.
Figure 11:
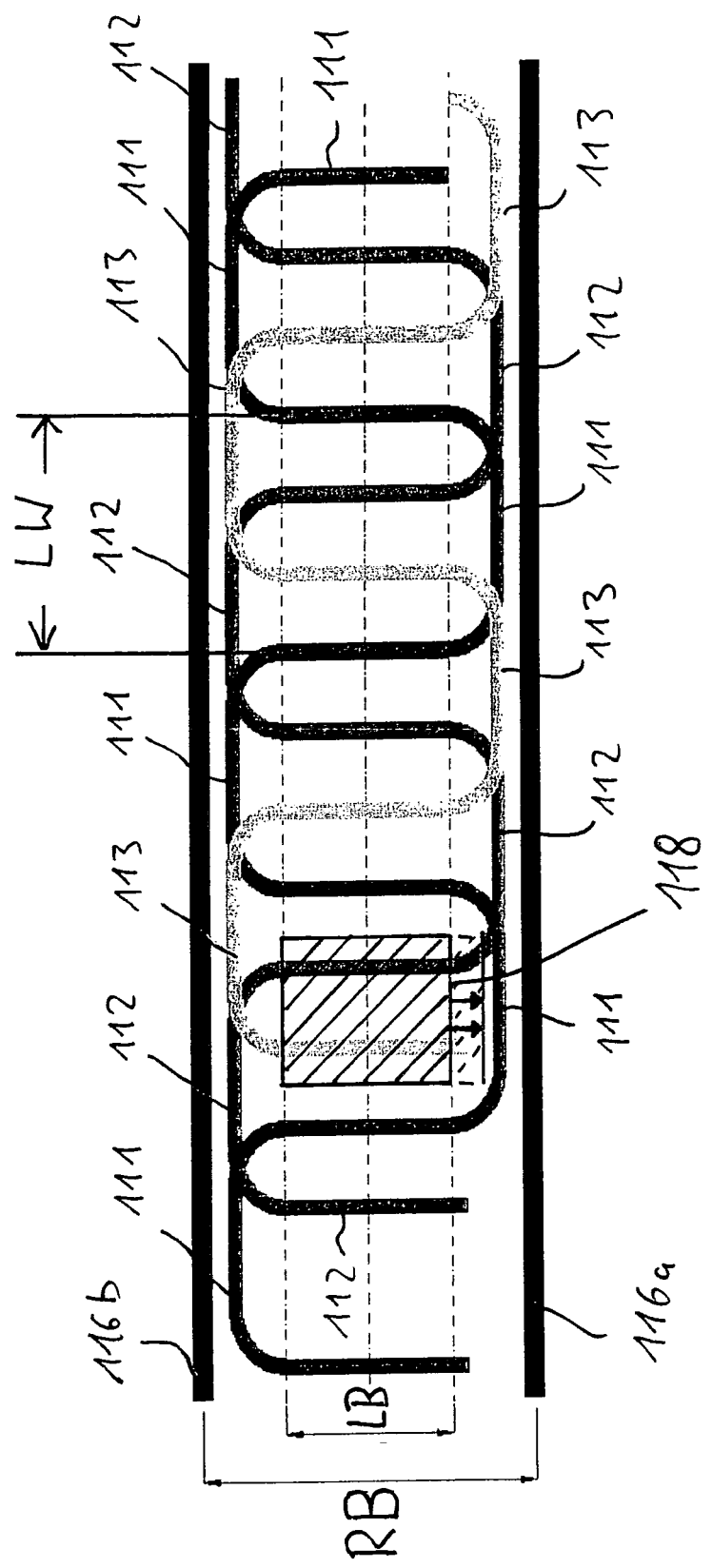

FIG. 1 shows a conductor arrangement which may be located underground along a track, for example along the rails of a railway (see the arrangement shown in FIG. 11, for example). The rails may extend from left to right in the view of FIG. 1.

FIG. 1 is understood to be a schematic view. The three lines 1, 2, 3 of the conductor arrangement comprise sections which extend transversely to the direction of travel (from left to right or right to left). Only some of the transversely extending sections of lines 1, 2, 3 are denoted by the reference numerals, namely three sections 5a, 5b and 5c of line 3, some further sections of the line 3 by "5", one section 5x of line 2 and one section 5y of line 1. In the most preferred case, the arrangement 12 shown in FIG. 1 is located underground of the track or in the sleepers of a railway so that FIG. 1 shows a top view onto the arrangement 12. The rails may extend from left to right, at the top and the bottom in FIG. 1, i.e. the transversely extending line sections may be completely within the boundaries defined by the rails (see also FIG. 11).

Figure 6:
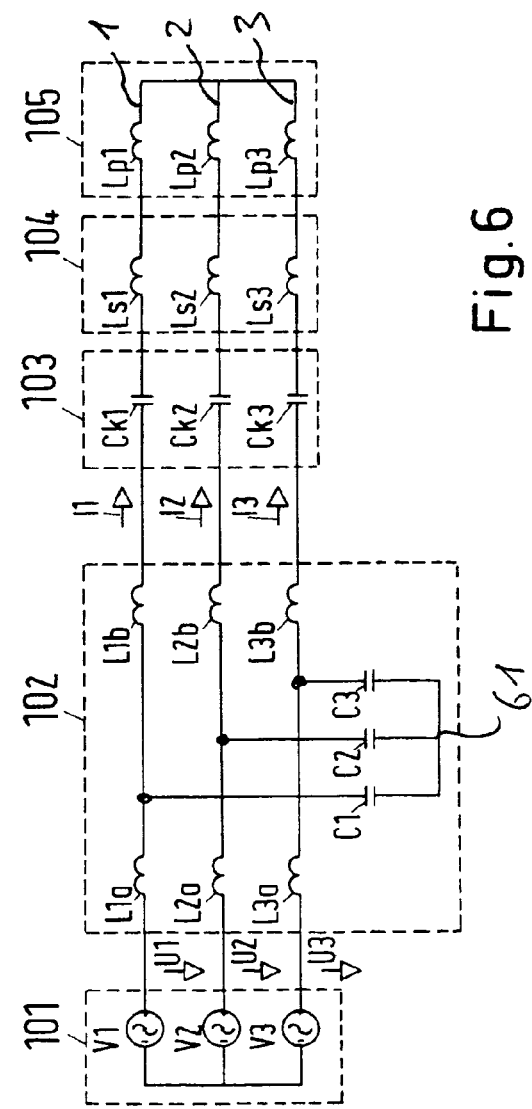

For example, in the manner as shown in FIG. 6, the three lines 1, 2, 3 may be connected to a three-phase AC current source. At the time which is depicted in FIG. 1, a positive current I1 is flowing through line 3. "Positive" means, that the current flows from the current source into the line. The three lines 1, 2, 3 are connected at the other end of the arrangement together at a common star point 4. Consequently, at least one of the other currents, here the current I2 through the line 2 and the current I3 through the line 1, are negative. Generally speaking, the star point rule applies which means that the sum of all currents flowing to and from the star point is zero at each point in time. The directions of the currents through lines 1, 2, 3 are indicated by arrows.

The sections of line 3 and the corresponding sections of lines 1, 2 which extend transversely to the direction of travel preferably have the same width and are parallel to each other. In practice, it is preferred there is no shift in width direction between the transversely extending sections of the three lines. Such a shift is shown in FIG. 1 for the reason that each section or each line can be identified.

Preferably, each line follows the same serpentine-like path along the track, wherein the lines are shifted in the direction of travel by one third of the distance between consecutive sections of the same line extending transversely to the direction of travel. For example, as shown in the middle of FIG. 1, the distance between consecutive sections 5 is denoted by $T_P$, the pole distance. Within the region between these consecutive sections 5, there are two other sections which extend transversely to the direction of travel, namely section 5x of line 2 and section 5y of line 1. This pattern of consecutive sections 5, 5x, 5y repeats at regular distances between these sections in the direction of travel.

The corresponding direction of the current which flows through the sections is shown in the left region of FIG. 1. For example, section 5a carries a current from a first side A of the arrangement 12 to the opposite side B of the arrangement. Side A is one side of the track (such as the right hand side in the direction of travel, when viewed from a travelling vehicle) and side B is the opposite side (e.g. the left side of the track), if the arrangement 12 is buried in the ground under the track, or more generally speaking, (at least the transversely extending sections) extends in a horizontal plane.

The consecutive section 5b consequently carries an electric current at the same time which is flowing from side B to side A. The next consecutive section 5c of line 3 is consequently carrying a current from side A to side B. All these currents have the same size, since they are carried by the same line at the same time. In other words: the sections which extend transversely are connected to each other by sections which extend in the direction of travel.

As a result of this serpentine like line arrangement the magnetic fields which are produced by sections 5a, 5b, 5c, ... of the line 3 produce a row of successive magnetic poles of an electromagnetic field, wherein the successive magnetic poles (the poles produced by section 5a, 5b, 5c, ... ) have alternating magnetic polarities. For example, the polarity of the magnetic pole which is produced by section 5a may correspond at a specific point in time a magnetic dipole, for which the magnetic north pole is facing upwardly and the magnetic south pole is facing downwardly. At the same time, the magnetic polarity of the magnetic field which is produced by section 5b is oriented at the same time in such a manner that the corresponding magnetic dipole is facing with its south pole upwardly and with its north pole downwardly. The corresponding magnetic dipole of section 5c is oriented in the same manner as for section 5a and so on. The same applies to lines 1 and 2.

However, the present invention also covers the case that there is only one phase, that there are two phases or that there are more than three phases. A conductor arrangement having only one phase may be arranged as line 3 in FIG. 1, but instead of the star point 4, the end of the line 3 (which is located at the right hand side of FIG. 1) may be connected to the energy source (not shown in FIG. 1) by a connector line (not shown in FIG. 1) which extends along the track. A two-phase arrangement may consist of lines 3 and 2, for example, but the distance between the transversely extending sections of the two lines (or more generally speaking: of all lines) is preferably constant (i.e. the distances between a transversely extending section of line 3 to the two nearest transversely extending section of line 2—in the direction of travel and in the opposite direction—are equal).

FIG. 11 is intended to illustrate some dimensions of the conductor arrangement, for example the conductor arrangement shown in FIG. 1. Only parts of the three lines 111, 112, 113 are shown in FIG. 11 and connections to each other (e.g. via the star point 4 of FIG. 1) and to the power supply are omitted.

The serpentine like lines 111, 112, 113 are located between two rails 116a, 116b of a railway for railway vehicles (such as regional or local trains, such as a tram). The expression "between" is related to the top view shown in FIG. 11. For example, the lines 111, 112, 113 may be located below the level of the rails 116.

Each of the lines 111, 112, 113 comprises linear sections which extend transversely to the direction of the track, i.e. the longitudinal direction of the rails 116. These transversely extending sections are connected to the consecutive transversely extending sections of the same line via longitudinally extending sections, which extend in the longitudinal direction of the rails. The transversely and linearly extending sections have a length LB, which is preferably at least as large as half the distance RB between the rails. For example, the distance RB may be 1 m and the length of the transversely extending sections may be 50 cm or in the range of 50 to 75 cm.

The transversely extending sections and the longitudinally extending sections of the same line are connected to each other by curved sections. The curvature corresponds, for example, to the curvature of a circle having a radius of 150 mm.

FIG. 11 also schematically shows a shaded area 118 which is covered by a coil of a receiving device of a vehicle travelling on the rails 116. The width of the coil is equal to the lengths of the transversely extending sections of the lines. However, in practice, it is preferred that this width is smaller than the length of the transversely extending sections. This allows for a shift in the position of the coil in the direction transverse to the travel direction, as indicated by two arrows and a line below the shaded area 118. Such a shift would not influence the reception of energy by the coil, if the shift would not move the coil beyond the boundaries of the transversely extending sections.

As follows from the time dependent diagram shown in FIG. 2, the currents through the phases 1, 2, 3 of FIG. 1 are phase currents of a conventional three-phase alternating current.

Figure 2:
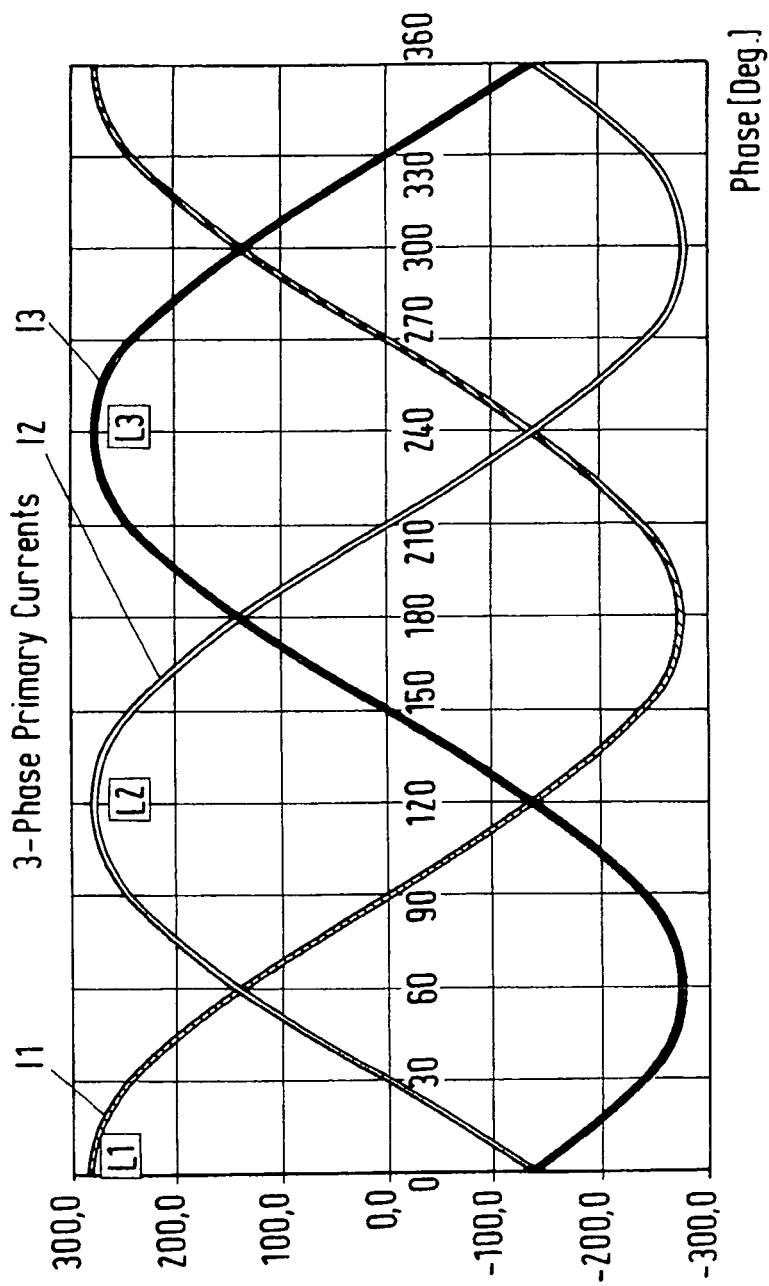

L1, L2, L3 in FIG. 2 denote that the serpentine like lines 1, 2, 3 form inductivities.

As shown in FIG. 2, the peak current value of the currents may be in the range of 300 A respectively −300 A. However, greater or smaller peak currents are also possible. 300 A peak current is sufficient to provide propulsion energy to a tram for moving the tram along a track of some hundred meters to a few kilometers, for example within the historic town centre of a city. In addition, the tram may withdraw energy from an on-board energy storage, such as a conventional electrochemical battery arrangement and/or a super cap arrangement. The energy storage may be charged again fully, as soon as the tram has left the town centre and is connected to an overhead line.

Figure 3:
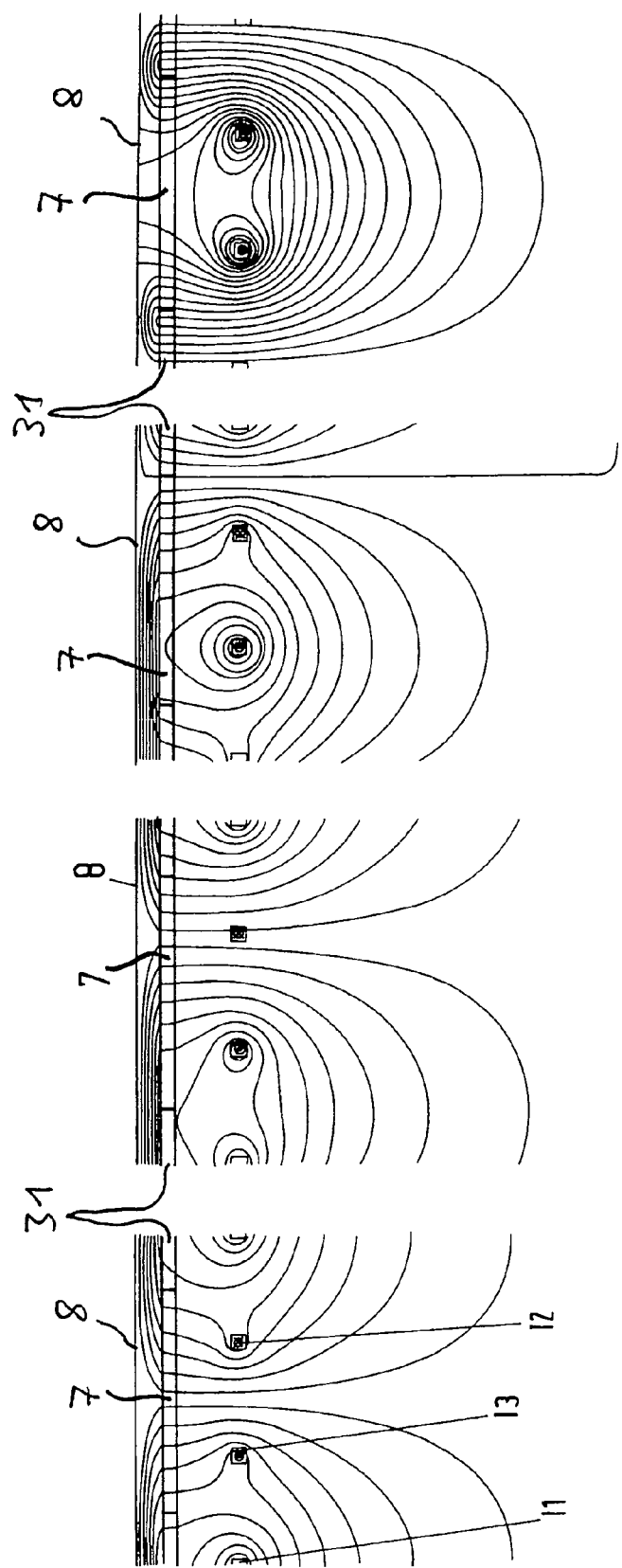

The bent lines in FIG. 3 are field lines of the magnetic field which is produced by the sections of lines 1, 2, 3 shown in FIG. 1. FIG. 3 depicts the situations at four different points in time which correspond to "0", "30", "60", "90" on the time scale of FIG. 2. The time scale of FIG. 2 can also be interpreted as a scale showing the angle of the sinusoidal behaviour of the currents, which means that FIG. 2 shows the behaviour of the currents over one full period, i.e. the current values at the beginning of the period at "0" are the same as at the end of the period at "360".

In the left of the four partial diagrams of FIG. 3, cross sections of transversely extending sections of lines 1, 2, 3 are shown. Reference sign "I1" denotes the current I1 which is flowing through a transversely extending section of line 1 and so on. These transversely extending sections extend perpendicularly to the image plane of FIG. 3, wherein the image plane is a vertical cut plane through the arrangement 12 of FIG. 1, wherein the image planes of FIG. 1 and FIG. 3 are perpendicular to each other and wherein the image plane of FIG. 3 extends in the direction of travel, cutting the sections 5 of FIG. 1 in two halves. In the upper regions of FIG. 3, electromagnetic coils 7 are schematically shown as flat rectangularly framed areas. On top of these coils 7, which are parts of a receiving device of a vehicle for receiving the energy from the arrangement 12, ferromagnetic backbones 8 are located in order to bundle and divert the magnetic field lines. These backbones 8 have the functions of a core of an electromagnet.

Figure 4:
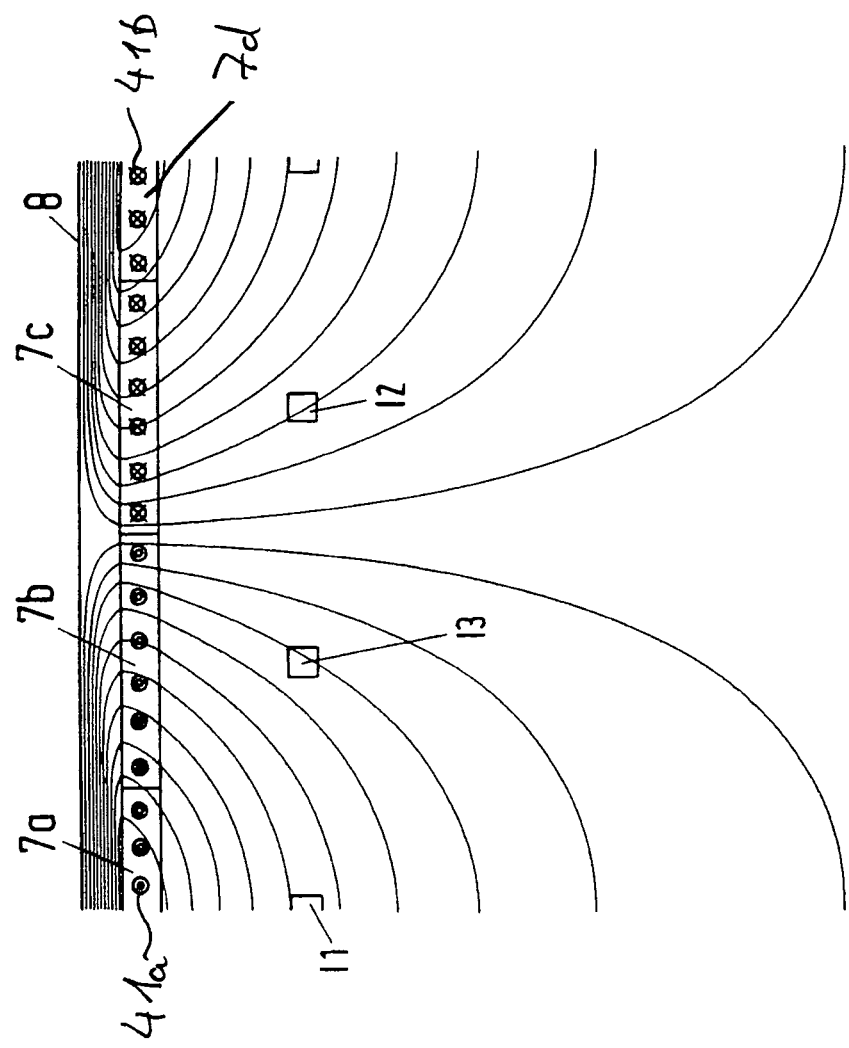

FIG. 4 shows a similar view as the views shown in FIG. 3. However, the figure is meant to illustrate the hypothetical situation that coils in the vehicle (which is travelling on the track) induce current in the conductor arrangement of the track. In addition to FIG. 3, FIG. 4 also shows cross sections through electric conductors 41a, 41b in the regions 7a, 7b, 7c, 7d of the coil 7. In region 7a, 7b, a current which is oriented upwardly out of the image plane of FIG. 4 is flowing at the depicted point in time. On the right hand side of FIG. 4, where regions 7c, 7d of coil 7 are shown, the current is directed downwardly into the image plane of FIG. 4, as indicated by crossed lines. The electromagnetic field (illustrated by the field lines in FIG. 4) which is produced by the coil 7, is symmetric to the border line of sections 7b and 7d, since the amounts of the currents in sections 7a to 7d are also symmetric to the border line.

Figure 5:
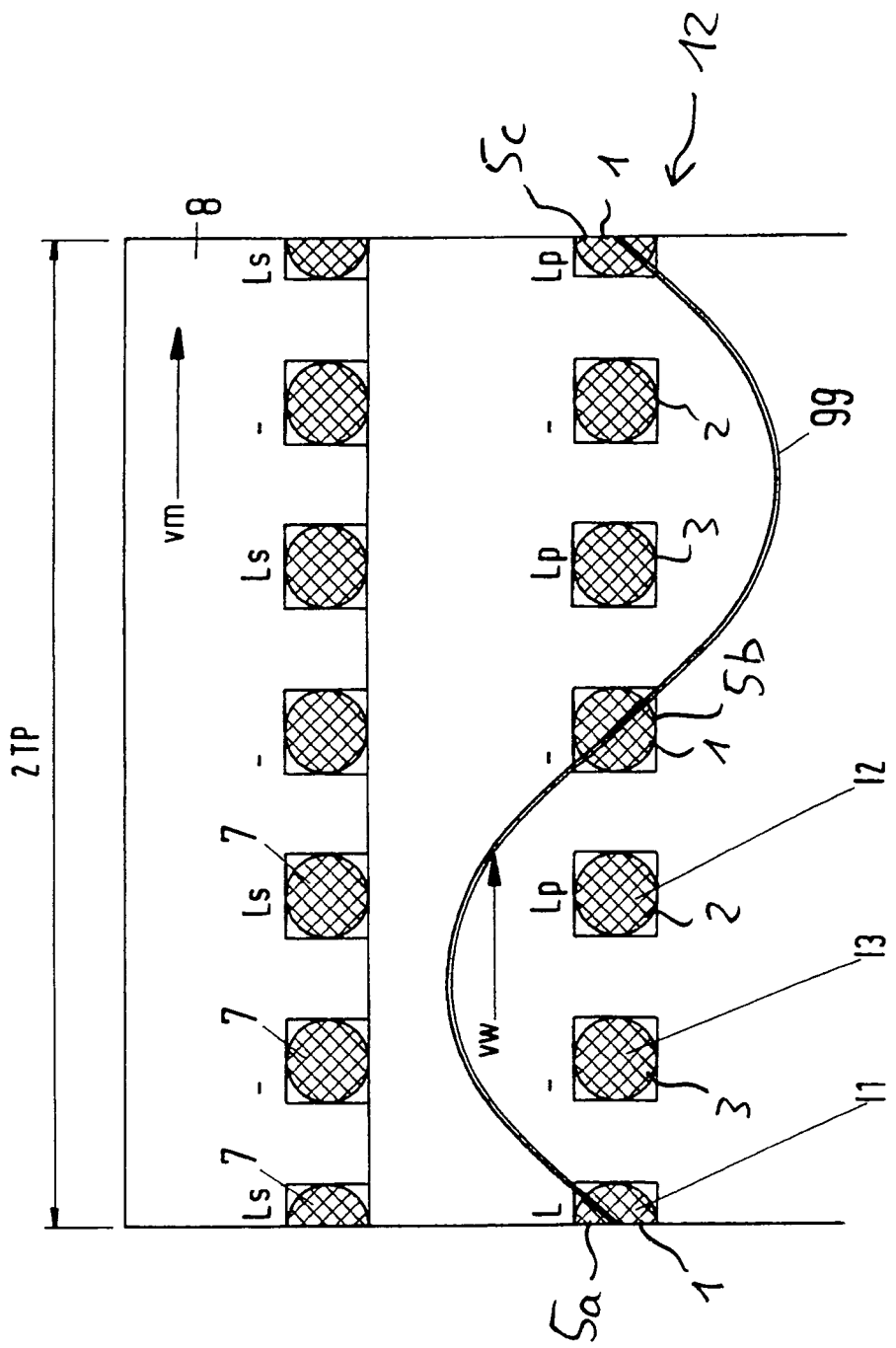

FIG. 5 shows another cut along a cutting plane which extends vertically and which extends in the travel direction. The wires or bundles of wires of lines 1, 3, 2 which are located in sections of the lines 1, 3, 2 which extend transversely to the direction of travel are shown in the upper half of FIG. 5. In total, seven sections of the arrangement 12 which extend transversely to the travel direction are shown in FIG. 5, at least partially. The first, fourth and seventh section in the row (from left to right) belong to line 1. Since the direction of the current I1 through section 5b (the fourth section in FIG. 5) is opposite to the direction of the current I1 through the sections 5a, 5c (the first and the seventh section in FIG. 5), and since the currents I1, I3, I2 are alternating currents, the produced electromagnetic wave is moving in the direction of travel at a speed vw. The wave is denoted by 99, the inductivity of the arrangement 12 by Lp.

The cross sections shown in the upper half of FIG. 5 represent a receiving device of a vehicle which is travelling in the direction of travel and at a speed vm and at the top of FIG. 5 "2 TP" indicates that FIG. 5 shows a line segment of arrangement 12, the length of which is equal to twice the distance between three consecutive transversely extending sections of a line, here line 1.

The arrangement shown in FIG. 6 comprises a conductor arrangement 103, 104, 105, which may be the conductor arrangement 12 according to FIG. 1. In order to show their electric properties, equivalent circuit symbols are used in FIG. 6. The three-phase system 103, 104, 105 carries phase currents I1, I2, I3 in phases 1, 2, 3. The inherent inductivities of the phases 1, 2, 3 are denoted by Lp1, Lp2, Lp3 which produce the electromagnetic field for transferring energy to any vehicle on the track. However, the lines 1, 2, 3 also comprise leakage inductivities Ls1, Ls2, Ls3, as indicated in block 104 in FIG. 6. The impedance of the inductivities is compensated by capacities Ck1, Ck2, Ck3 in the lines 1, 2, 3 as shown in block 103.

The electric energy which is used to produce the electromagnetic fields in lines 1, 2, 3 is generated by a three-phase voltage source 101. The phase sources for the phases are denoted by V1, V2, V3 in block 101. The produced voltages in the lines 1, 2, 3 are denoted by U1, U2, U3. The voltage source is connected to the input of a constant-current source 102. An output of this source 102 is connected to the capacities in block 103. At the output of source 102 the currents I1, I2, I3 are generated. These currents are constant over time, independently of the energy which is transferred from lines 1, 2, 3 to any vehicle on the track. At the input side of constant current source 102, the source 102 comprises in each line 1, 2, 3 an input inductivity L1$a$, L2$a$, L3$a$. At the output side of the source 102, each line 1, 2, 3 comprises an output inductivity L1$b$, L2$b$, L3$b$. In between the input and output inductivities, each line 1, 2, 3 is connected to a common star point 61 via a capacity C1, C2, C3.

Figure 7:
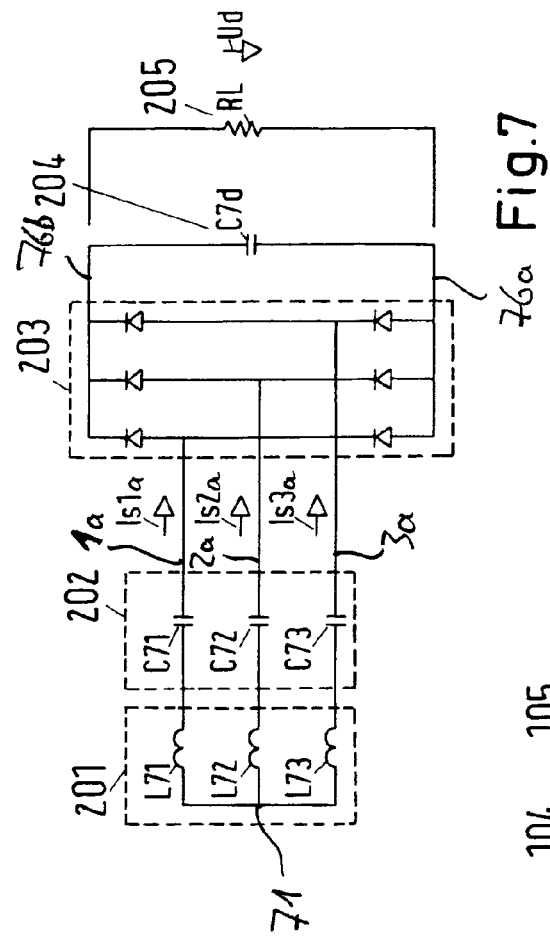

FIG. 7 shows a circuit diagram of an arrangement which may be located in a vehicle which is travelling on the track. The arrangement comprises a three-phase receiving device for receiving the electromagnetic field from the track and for producing electric energy therefrom. The receiving device comprises one coil or an arrangement of coils for each phase 1$a$, 2$a$, 3$a$, wherein the coils are denoted by L71, L72, L73 (block 201). In the embodiment shown, the phases 1$a$, 2$a$, 3$a$ are connected together at a common star point 71. Leakage inductivities (not separately shown in FIG. 7) of the phases 1$a$, 2$a$, 3$a$ are compensated by capacities C71, C72, C73, as shown in block 202.

The output side of the receiving device 201, 202, where the phase currents Is1$a$, Is2$a$, Is3$a$ are shown in FIG. 7 is connected to an AC/DC (alternating current/direct current) converter 203. The DC-side of the converter 203 is connected to lines 76$a$, 76$b$ of an intermediate circuit. The lines 76$a$, 76$b$ are connected to each other via a smoothing capacity C7$d$ as indicated by "204". The electric load, which may be provided with energy within the vehicle is denoted by a resistance RL at "205" which may be connected to the lines 76$a$, 76$b$ of the intermediate circuit. "Ud" indicates that the load RL may cause a voltage drop, wherein Ud is the voltage in the intermediate circuit for example.

Figure 8:
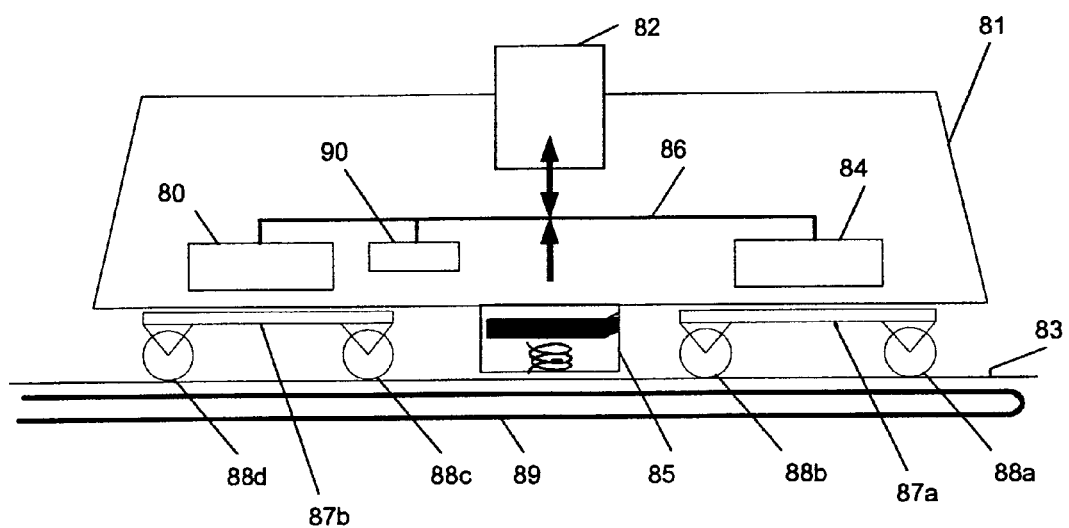

FIG. 8 shows a track 83 (here: a railway track having two rails) which is occupied by a track bound vehicle 81, such as a regional public transport train or a tram.

The arrangement shown comprises an electric conductor arrangement for producing an electromagnetic field, thereby transferring energy to the vehicle on the track. The conductor arrangement 89 is shown schematically. For example, the conductor arrangement may be designed as shown in FIG. 1. The conductor arrangement 89 (and this applies to other arrangements, not only to the example shown in FIG. 8) may be located underground or above ground. In particular in the case of railways having two rails on which wheels of rail vehicles may roll, the conductor arrangement may be located above ground between the rails on the level of a railway sleeper, or partly above ground, but under the railway sleepers. If the railway sleepers are made of concrete for example, the sleepers or the other construction for holding the rails may comprise holes and/or cavities, through which the line or lines of the conductor arrangement extends. Thereby, the railway construction may be used to hold the line(s) in the desired serpentine shape.

The track bound vehicle 81 comprises at its underside a receiving device 85 for receiving the electromagnetic field which is produced by the conductor arrangement 89. The receiving device 85 is electrically connected to an on-board electric network 86 so that the electric energy, which is induced in the receiving device 85 may be distributed within the vehicle 81. For example, auxiliary devices 90 and propulsion units 80, 84 for driving propulsion motors (not shown) in bogies 87$a$, 87$b$ having wheels 88$a$, 88$b$, 88$c$, 88$d$ may be connected to the distribution network 86. Furthermore, an energy storage 82, such as an electrochemical energy storage or an arrangement of capacitors, such as super caps, may also be connected to the distribution network. Therefore, the energy storage 82 may be charged by the energy received by the receiving device, in particular during stops of the vehicle 810$n$ the track. When the vehicle 81 is moving on the track, a part of the propulsion energy which is needed to move the vehicle 81 may be withdrawn from the energy storage 82 and at the same time the energy, which is received by the receiving device may contribute to the propulsion, i.e. may be part of the propulsion energy.

Figure 9A:
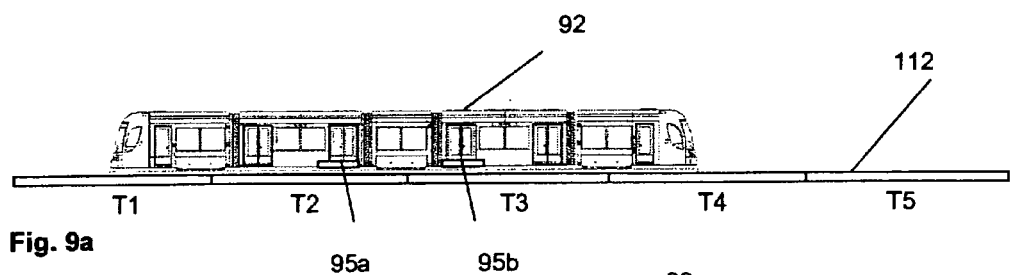
Figure 9B:
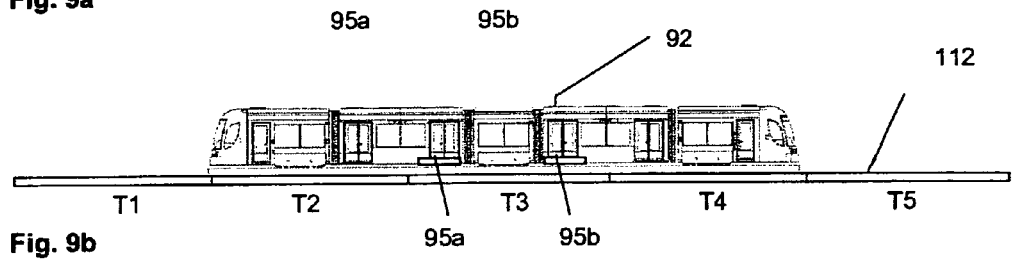
Figure 9C:
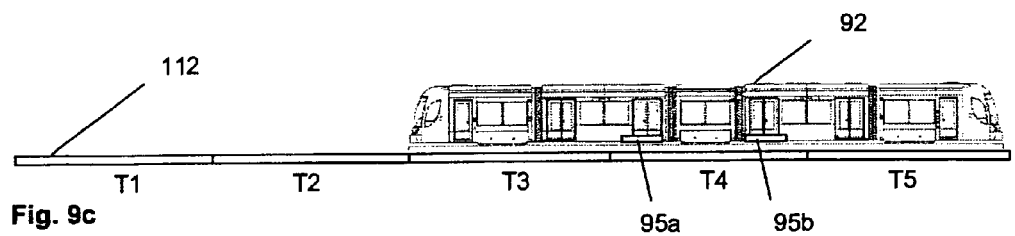

FIG. 9$a$-$c$ illustrate the concept of a conductor arrangement 112 comprising sections which can be switched on and off so that only sections, which are switched on produce an electromagnetic field in order to transfer energy to the vehicle or vehicles on the track. The examples of FIG. 9 show 5 segments T1, T2, T3, T4, T5 which are arranged in a row of successive segments along the track.

A vehicle 92, such as a tram, is travelling on the track. Under floor of the vehicle 92 two receiving devices 95$a$, 95$b$ (i.e. two different units) for receiving electromagnetic field produced by the segments are provided. The receiving devices 95$a$, 95$b$ may be redundant devices, wherein just one of the devices is necessary for operating the vehicle. This increases operation safety. However, the devices 95$a$, 95$b$ may also be non-redundant devices which may produce energy at the same time for operating the vehicle. However, it may happen in this case, that at least one of the devices 95 may not produce electric energy. Instead of two receiving devices, the vehicle may comprise more receiving devices.

The following description relates to all these cases and, in addition, to the case that the vehicle has just one receiving device.

According to the examples shown in FIG. 9, the vehicle is moving from the left to the right. In FIG. 9$a$ the vehicle 92 occupies the track above elements T2, T3 and partly occupies the track above elements T1 and T4. The receiving devices 95 or the receiving device are located always above elements which are fully occupied by the vehicle. This is the case, because the distance between the receiving devices to the nearest end of the vehicle in lengthwise direction is greater than the length of each segment of the conductor arrangement 112.

In the situation of FIG. 9$a$, the elements T2, T3 are switched on and all other elements T1, T4, T5 are switched off. In FIG. 9$b$, where the vehicle 92 fully occupies the track above elements T2, T3 and nearly fully occupies the track above element T4, element T2 has been switched off, because the receiving devices 95 or the receiving devices have/has already left the region above element T2, and element T4 will be switched on as soon as the vehicle fully occupies the region above the element T4. This state, when the element T4 is switched on is shown in FIG. 9$c$. However, in the meantime element T3 has been switched off.

Figure 10:
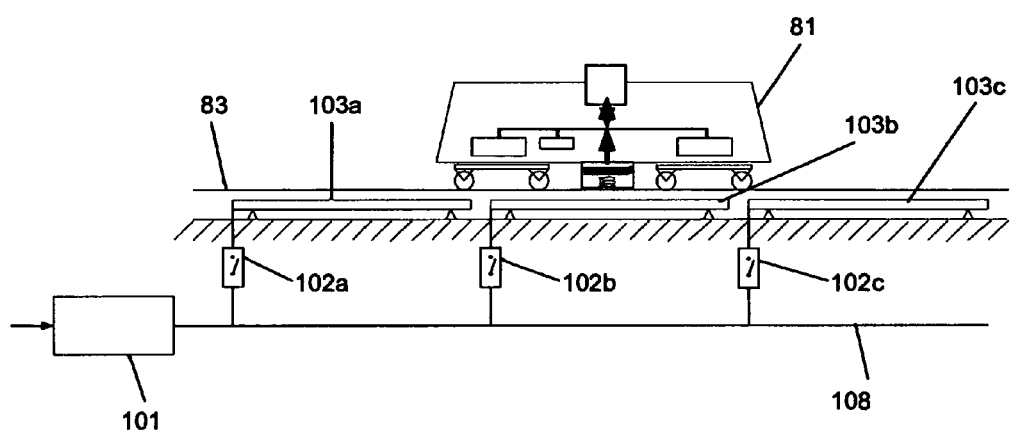

FIG. 10 shows an arrangement which is similar to the arrangements shown in FIG. 9. In fact, it may be a different view of the same arrangements as shown in FIG. 9. However, FIG. 10 shows additional parts of the arrangement. Each of the successive segments 103$a$, 103$b$, 103$c$ of the conductor arrangement for producing an electromagnetic field is connected via a separate switch 102$a$, 102$b$, 102$c$ for switching on and off the element 103, to a mainline 108. In the case of a three-phase alternating current system, the mainline 108 may comprise wires or cables for each phase. The far end of the mainline 108 (at the right hand side of FIG. 10, but not shown) may comprise a common star point of all three-phases. On the opposite site of the mainline 108, it is connected to an energy source 101, such as the arrangement according to blocks 101, 102 as shown in FIG. 6.

Figure 12:
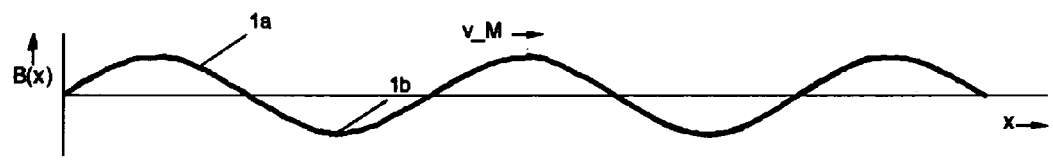

The magnetic wave shown in FIG. 12 is the resulting wave produced by at least two phases of a conductor arrangement extending along the path of travel of the vehicle. For example, the conductor arrangement shown in FIG. 1 may produce the wave in FIG. 12. The horizontal axis x is extending in the travel direction of the vehicle (or opposite to this travel direction). The vertical axis in FIG. 12 is the axis of the magnetic field intensity B(x). The wave comprises positive poles as indicated by 1a and comprises negative poles as indicated by 1b. The wave is propagating at a velocity v_M. The velocity v_M is equal to twice the length Tp (shown in FIG. 1) multiplied with the frequency of the alternating current or alternating voltage of the conductor arrangement, for example the conductor arrangement shown in FIG. 1. However, it is not necessary that the conductor arrangement comprises a star point (e.g. the star point 4 in FIG. 1). Other configurations are also possible. For example, instead of the star point 4 in FIG. 1, the lines 1, 2, 3 can be connected at both opposite ends to the power supply line. Furthermore, the power supply line may be an alternating current line or, alternatively, may be a direct current line. In the case of a direct current line the opposite ends of the lines 1, 2, 3 may by connected to the DC power supply line via a DC/AC converter at both ends. For example, the length Tp (the pole distance) between consecutive sections of the conductor arrangement along the path of travel may be in the range of 0.1 m to 1 m and the frequency of the alternating current or voltage may be in the range of 1 kHz to 100 kHz so that the propagation velocity v_M may be in the region of 200 m/s to 20 km/s. Consequently, the velocity is much higher than the velocity of the vehicle and, as a result, the different windings or coils of the receiving device of the vehicle will produce the same output power, it they are constructed in the same manner, although they are located at different positions in lengthwise direction.

For example if the conductor arrangement shown in FIG. 1 is fed by a three-phase alternating current, wherein the different phase currents have a corresponding phase shift, this system of alternating currents can be considered as a system of corresponding rotating pointers in a complex plane.

Figure 13:
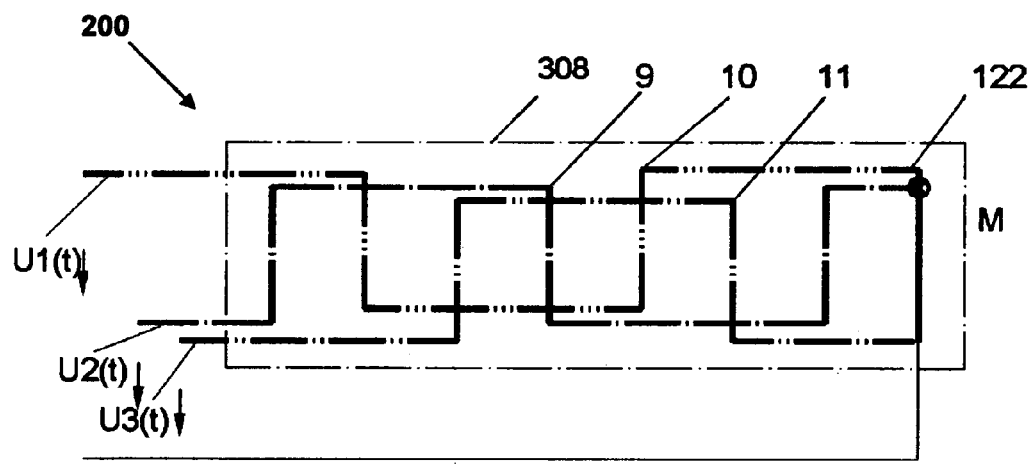

The receiving device 200 which is schematically shown in FIG. 13 may be used to receive the energy of the electromagnetic field which is produced by the conductor arrangement along the path of travel. The receiving device 200 comprises an area 308 which extends in the direction of travel (the horizontal direction in FIG. 13) and which also extends transversely to the direction of travel (the vertical direction in FIG. 13). Preferably, the area 308 is extending in a horizontal plane and the corresponding conductor arrangement (e.g. the arrangement shown in FIG. 1) which extends along the path of travel is also extending in a horizontal plane below the plane of area 308.

Figure 22:
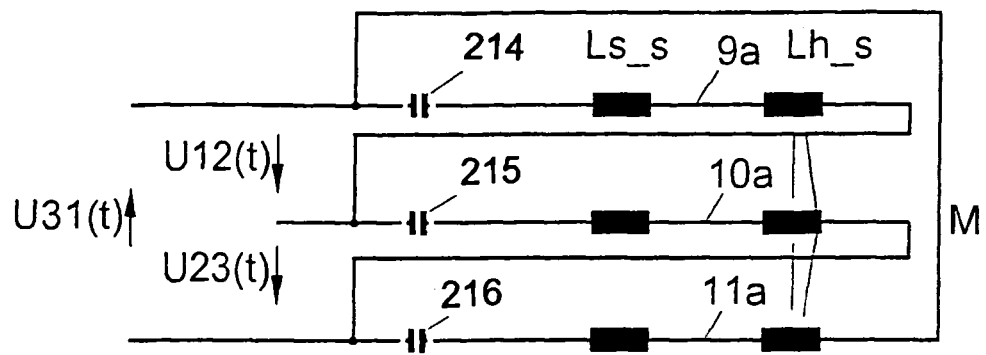

Within the area 308, the receiving device 200 comprises, according to the example shown in FIG. 13, three phases, each having at least one line 9, 10, 11. As shown in FIGS. 13, 15, 16 and 17, each phase may have a single line 9, 10, 11 which is connected to a common star point 122. However, alternative solutions are also possible. For example, as shown in FIG. 18, each phase may comprise more than one line. In the example shown in FIG. 18, there are two parallel lines 9, 9a; 10, 10a; 11, 11a for each phase. As shown in FIG. 22, it is not necessary to have a common star point of the phases. Rather, the phases may form a delta circuit.

Due to the magnetic coupling (in other words: inductive coupling) between the conductor arrangement which extends along the path of travel and the receiving device of FIG. 13 to FIG. 26, alternating voltages U1, U2, U3 are induced in the phases of the receiving device. The magnetic coupling is symbolized by letter M in FIG. 13 to FIG. 26.

Other than shown in FIGS. 13 to 26, the receiving device may have two phases only or may have more than three phases.

As shown in FIG. 13, FIG. 15 and FIG. 16, the lines 9, 10, 11 of the receiving device may extend in a serpentine manner in the direction of travel until they meet each other at the star point 122. However, as shown in FIG. 17, the lines 9, 10, 11 may—alternatively or in addition to the serpentine configuration—form closed loops.

As shown in the side view of FIG. 14, the lines of the receiving device may extend within a layer 201 and a slab shaped body 211 may extend in a plane parallel to the plane of the layer 201. As mentioned earlier, it is preferred that the planes of the layer 201 and of the body 211 extend in a (nearly) horizontal plane.

Figure 17:
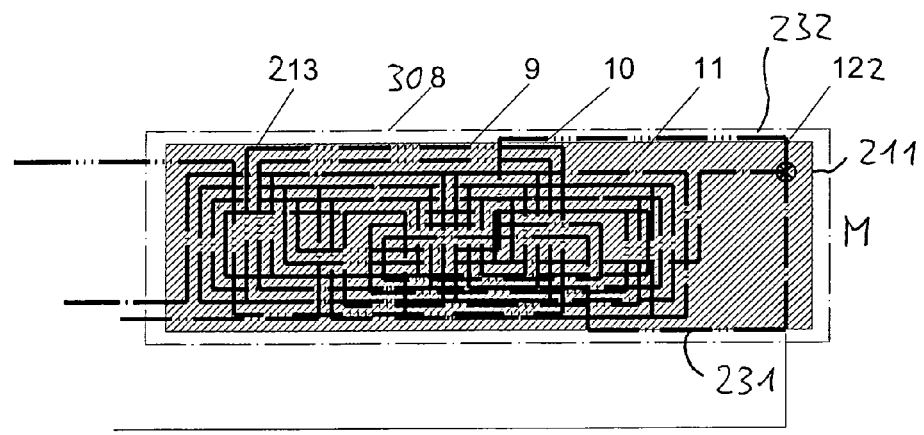
Figure 18:
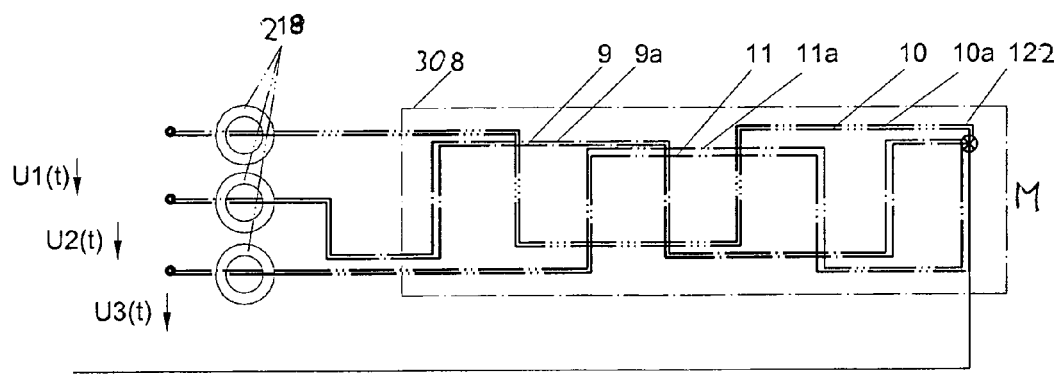

The top views of FIG. 15, FIG. 16 and FIG. 17 show that the size of the body 211 may vary compared to the area 308 within which the lines 9, 10, 11 of the receiving device form loops or winding for receiving the field energy of the electromagnetic field. Preferably, the length of the body 211 in the direction of travel (which is indicated in FIG. 14 by an arrow marked with v_A, indicating the velocity of the vehicle) is at least as large as the area in which the lines 9, 10, 11 of the receiving device form loops or winding for receiving the field energy. Most preferred, the length of the body is substantially the same as the length of this area.

Furthermore, it is preferred that the width of this area is substantially equal to the width of the body 211, as shown in FIG. 16 and FIG. 17. The advantage of such an arrangement is that the heads of the loops or windings (two of the heads are denoted by reference numerals 231, 232 in FIG. 17) are also covered by the body 211 and, therefore, the electromagnetic field produced by the lines 9, 10, 11 is shielded from the interior of the vehicle if the body 211 extends in a horizontal plane between the receiving device and the interior of the vehicle. On the other hand, as explained above in connection with FIG. 3, the body 211 bundles the field lines of the magnetic fields and therefore increases the efficiency of the magnetic coupling between the conductor arrangement along the path of travel and the moving receiving device of the vehicle.

It is also preferred that (as shown in FIG. 17) the whole area which is covered by the ferromagnetic body 211 comprises loops or windings of the receiving device, i.e. the whole area can be used as receiving area for receiving the magnetic flux of the electromagnetic field produced by the conductor arrangement along the path of travel.

Preferably, each of the different phases of the receiving device comprises line sections of the winding or coil which extend transversely to the direction of travel, wherein the sections of different phases are distributed among the length of the receiving device in the direction of travel and wherein these sections form a row of consecutive sections in the direction of travel in the same manner as described above for the conductor arrangement which extends along the path of travel. This means that the alternating currents which are induced by the electromagnetic field are flowing in opposite directions if two neighbouring sections are considered, thereby producing opposite magnetic poles. Consequently, the magnetic fields which are produced by the different phases compensate each other, even at locations having a short distance to the windings or coils of the receiving device. In particular, the magnetic fields compensate each other at short distances in any direction transverse to the travel direction (in FIG. 13 the direction perpendicular to the image plane and the vertical direction of the image).

Figure 19:
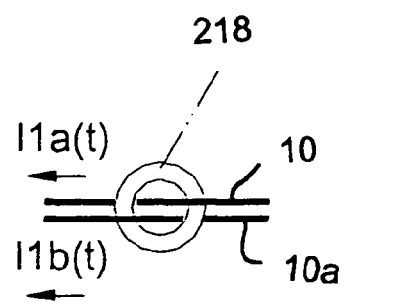

FIG. 18 schematically shows the principle of using two parallel lines for each phase of the receiving device. The same principle can be applied if the phases are not connected to a star point connection 122. As shown in FIG. 19 for one of the phases (for example for lines 10, 10a), both lines extend through the interior opening of a ferromagnetic ring 218, but in opposite direction, i.e. the lines which are parallel elsewhere are not parallel, but anti-parallel in the region of the transformer. The ring 218 couples the magnetic fields of the lines 10, 10a, so that any difference of the parallel currents I1a(t) I1b(t) is compensated.

Figure 20:
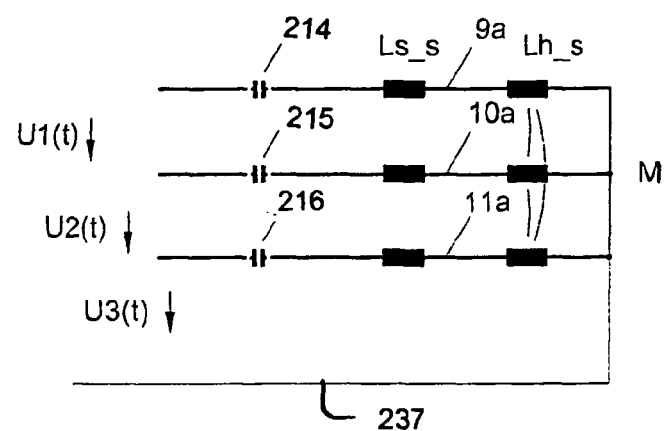

FIG. 20 illustrates the principle of compensating the inductivities of the phases of the receiving device. The total inductivity of each phase can be split into a main inductivity Lh_s and a stray inductivity or leakage inductivity Ls_s. The main inductivity is the part of the total inductivity which is magnetically coupled to the conductor arrangement which extends along the path of travel, but is not moving in a travel direction. The total inductivity of each phase is compensated by the respective capacity of the phase so that the resulting impedance is zero. In the example shown in FIG. 20, the inductivity of phase line 9a is compensated by capacity 214, the inductivity of phase line 101 is compensated by capacity 215 and the inductivity of phase line 11a is compensated by capacity 216. The resulting voltages between the terminals of phase lines 9a, 10a, 11a and reference potential 237 are denoted in FIG. 20 by U1(t), U2(t), U3(t) in order to indicate that the series connection of the inductivities L and the capacities 214, 215, 216 shown in FIG. 20 produces phase voltages having a constant amplitude, if the non-moving conductor arrangement is fed by an alternating current having a constant amplitude.

Figure 21:
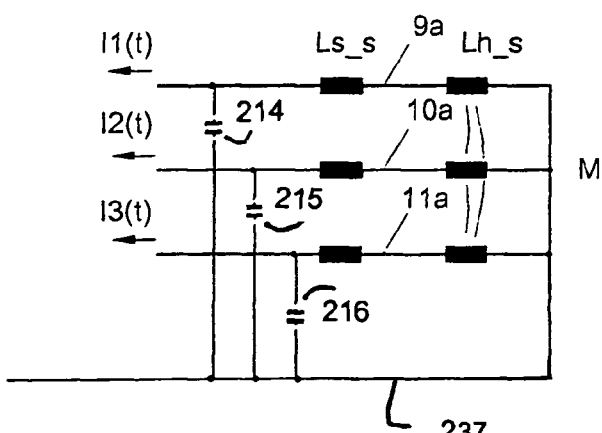

However, as shown in FIG. 21, the same compensation of the total inductivity of each phase can be achieved by connecting the phase to reference potential 237 via the respective capacity 214, 215, 216. The phase currents denoted by I1(t), I2(t), I3(t) in FIG. 21 indicate that this parallel connection of inductivities and compensating capacities will produce alternating phase currents of constant amplitudes if the conductor arrangement on the primary side of the electromagnetic field is fed by an alternating current having a constant amplitude. However, if the primary side is driven by an alternating voltage having a constant amplitude, the output voltage of the phase lines 9a, 10a, 11a has a constant amplitude.

In the delta connection shown in FIG. 22, the capacities 214, 215, 216 are also connected in series to the inductivities of the phase lines 9a, 10a, 11a.

Figure 23:
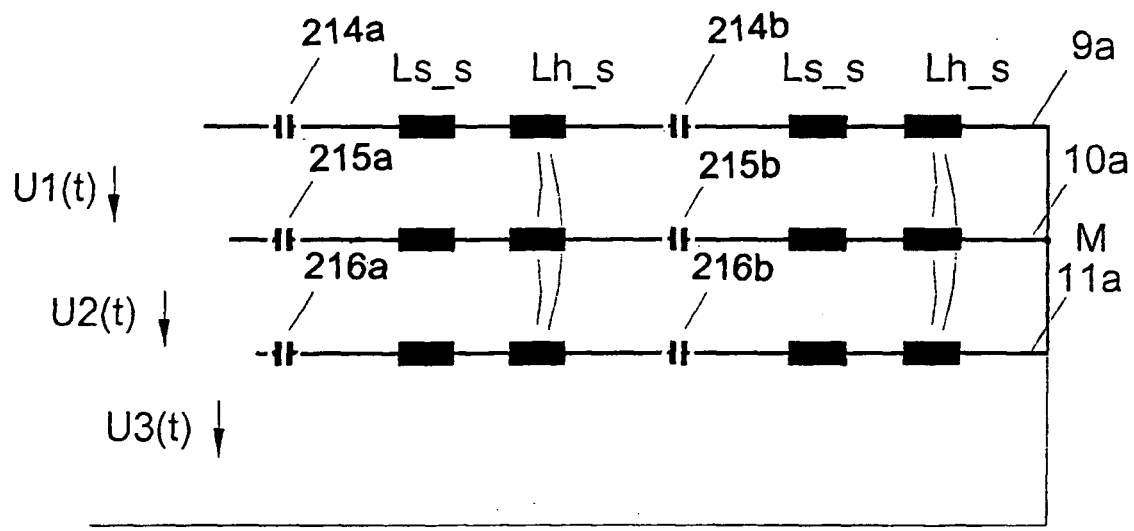

Depending on the inductivity of the phase lines 9a, 10a, 11a, and further depending on the intensity of the received electromagnetic fields, high voltages can be induced. A maximum value of the induced voltage can be defined, such as 1 kV. If the induced voltage is expected to exceed the maximum value during operation of the receiving device, the compensating capacities 214, 215, 216 are divided into partial capacities and these partial capacities are distributed among the course of the phase lines 9a, 10a, 11a. For example, as shown in FIG. 23, the compensating capacity may be divided into two partial capacities 214a, 214b; 215a, 215b; 216a, 216b and one of the partial capacities 214a, 215a, 216a is arranged at the terminals of the phase lines 9a, 10a, 11a and the other partial capacity 214b, 215b, 216b is arranged at a location of the phase line 9a, 10a, 11a which divides the inductivity L into two halves.

Figure 24:
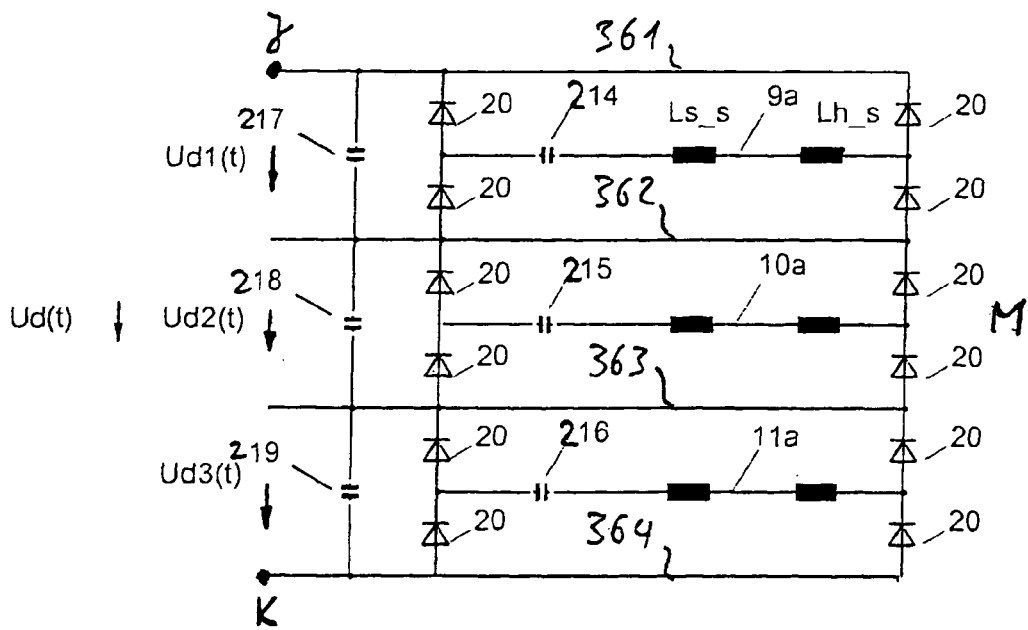

The circuit shown in FIG. 24 also comprises compensating capacities 214, 215, 216 which are connected in series to the inductivity L of the phase lines 9a, 10a, 11a. These phase lines are connected in each case at the opposite terminals of the phase lines to a bridge formed by two diodes 20 which are connected in series to each other. The terminals of the phase lines are connected to a line section of the bridge which connects the two diodes 20.

The bridges on the same side (e.g. at the respective corresponding terminals) of the phase lines are connected in series to each other. Furthermore, the bridges at the opposite end of each phase line are connected in parallel to each other by shortening lines 361, 362, 363, 364, as shown in FIG. 24 and capacities 217, 218, 219 are connected in parallel to the bridges of each phase line. These capacities will smooth the fluctuations of the direct voltages across the bridges of each phase. As shown in FIG. 24, the three capacities 217, 218, 219 are effectively connected in series to each other and the corresponding voltages Ud1(t), Ud2(t), Ud3(t) which are produced by the three phases are added together. The total voltage is denoted by Ud(t). Despite the smoothing capacities 217, 218, 219, the total voltage Ud(t) is still fluctuating, depending on the electric energy which is produced by the phase lines 9a, 10a, 11a and also depending on the electric load which is connected to the terminals J, K of the circuit shown in FIG. 24. If there are only two phase lines or more than 3 phase lines, the circuit shown in FIG. 24 can be modified correspondingly. For example in the case of two phase lines, phase line 11a, capacity 219 and the respective bridges at the opposite ends of the phase lines 11a can be omitted.

According to a specific embodiment of the circuit shown in FIG. 24, the capacities 217, 218, 219 are energy storages, for example super caps. The energy which is stored in the energy storages can directly be used for operating electric and electronic devices within the vehicle. In particular, at least one propulsion motor of the vehicle can be operated using the energy which is stored.

Figure 25:
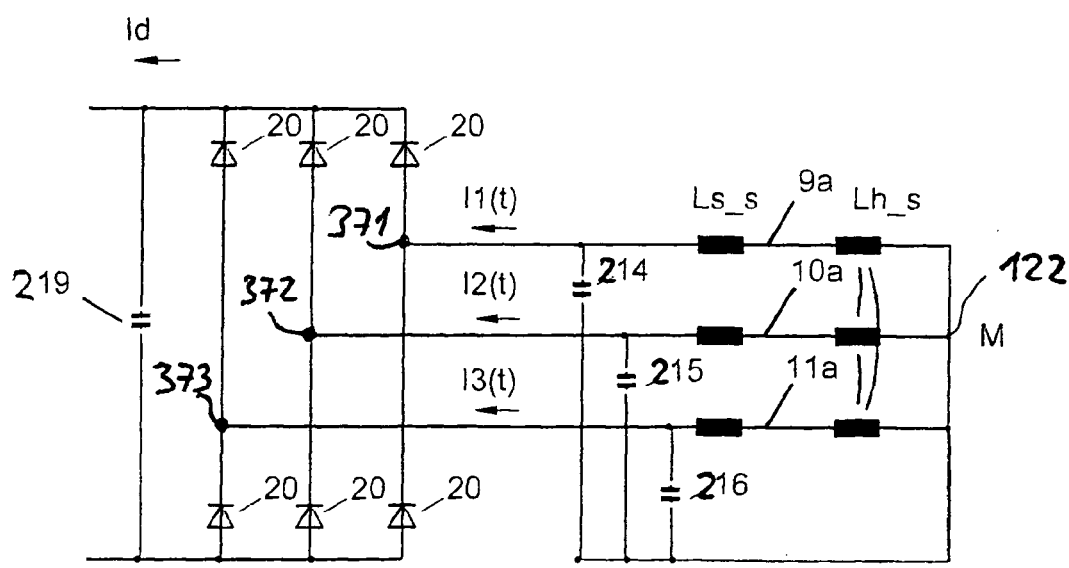

According to the embodiment of the receiving device shown in FIG. 25, the phase lines 9a, 10a, 11a are connected to a common star point 122. The opposite terminals 371, 372, 373 of the phase lines 9a, 10a, 11a, are connected, in each case, to a rectifier bridge comprising two diodes 20. These three bridges are connected in parallel to each other so that the rectified direct currents are added to each other. The total current Id can be used to operate any electric or electronic device within the vehicle. A smoothing capacity 219 is connected in parallel to the bridges. Optionally, the capacity 219 may be an energy storage, such as an arrangement of super caps.

Figure 26:
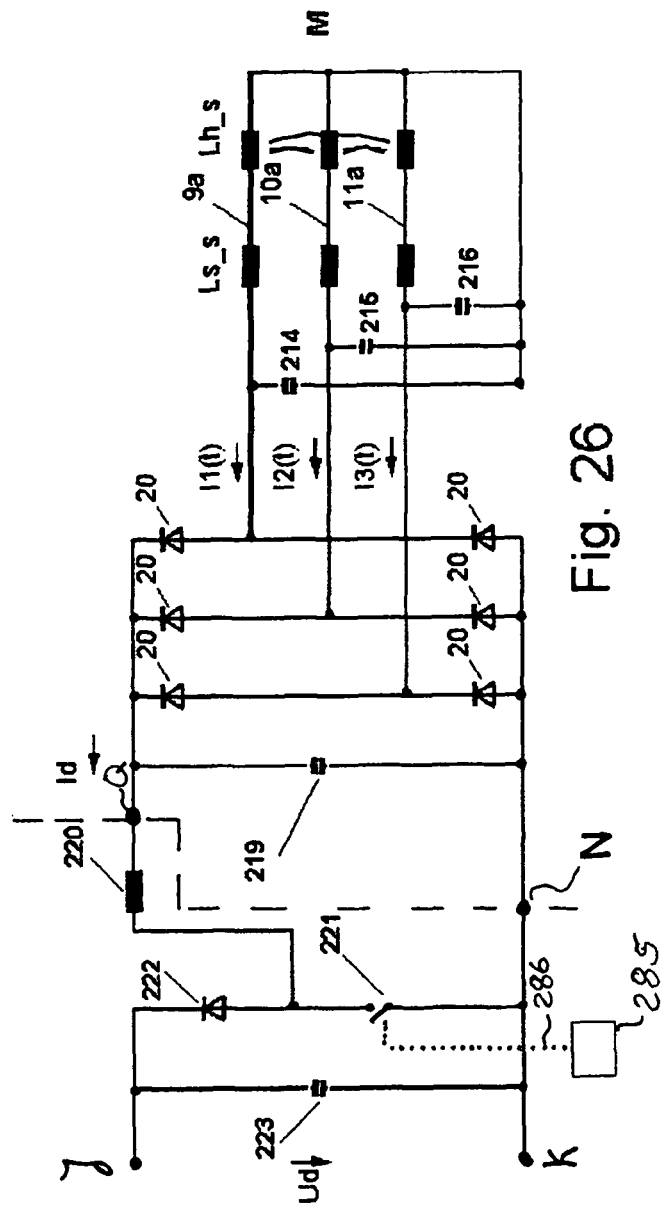

A modification of the circuit shown in FIG. 25 is illustrated in FIG. 26. All parts and components on the right hand side of the dashed line in FIG. 26 are parts of the circuit shown in FIG. 25. However, the circuit on the right hand side of the dashed line can be replaced by any other receiving device comprising at least one rectifier for rectifying the alternating current produced by the phase lines. The circuit part on the left hand side of the dashed line will be explained in the following.

The two connection points or the receiving device and the circuit part on the left hand side of the dashed line are denoted by Q, N, wherein the electric potential at point N is higher than the electric potential at point Q. A series connection consisting of a switch 221 and an inductivity 220 is connected between the connection points N, Q. Furthermore, point Q is connected via the inductivity 220 and via diode 222 to the minus terminal J of the circuit. Point N is directly connected to the other terminal K of the circuit, the plus terminal. An energy storage 223 is connected between the terminals J, K.

Switch 221 is controlled by a control device 285 which is connected to switch 221 via a control line 286. Furthermore (not shown in FIG. 26), control device 285 is connected to a measuring device which is adapted to measure the voltage across energy storage 223 or adapted to measure the loading state of the energy storage 223. If the energy storage 223 is fully loaded, control device 285 closes switch 221 so that connection points N, Q are shortened via capacity 220 and the receiving device cannot deliver electric energy to the storage 223.

As soon as the energy storage 223 is not fully loaded any more (due to self-de-loading and/or because energy has been delivered to any consumer in the vehicle) control device 285 opens switch 221 and the energy storage 223 will be loaded again by the receiving device if the windings or coils of the receiving device receive an electromagnetic field.

The invention claimed is:

1. An arrangement for providing a vehicle with electric energy, wherein the arrangement comprises a receiving device adapted to be arranged on the vehicle to receive an alternating electromagnetic field and to produce an alternating electric current by electromagnetic induction, wherein the receiving device comprises a plurality of windings and/or coils of electrically conducting material, wherein each winding or coil is adapted to produce a separate phase of the alternating electric current and wherein a body comprising a ferromagnetic material is arranged above the windings and/or coils which are arranged only on one side of the body.

2. The arrangement of claim 1, wherein the windings and/or coils are connected to a converter for converting the alternating current into a direct current.

3. The arrangement of claim 1, wherein the body has the shape of a slab.

4. The arrangement of claim 1, wherein sections of the windings and/or coils, which sections extend transversely to the direction of travel of the vehicle and which extend substantially in a common plane, are distributed—in the direction of travel—along a length which has the same size as a projection of the surface area of the body onto the plane and wherein the windings and/or coils are distributed throughout the whole length.

5. The arrangement of claim 1, wherein sections of the windings and/or coils, which sections extend transversely to the direction of travel of the vehicle and which extend substantially in a common plane, extend within the limits of a width which is the width of an area which has the same size as a projection of the surface area of the body onto the plane.

6. The arrangement of claim 1, wherein at least one of the phases of the receiving device comprises two lines which are electrically connected in parallel to each other and wherein the lines are connected to the electric load in the vehicle via a differential current transformer for eliminating any differential current of the two parallel lines.

7. The arrangement of claim 1, wherein a capacity is connected in series to each of the windings and/or coils.

8. The arrangement of claim 1, wherein a capacity is connected in parallel to each of the windings and/or coils.

9. The arrangement of claim 1, wherein the windings and/or coils are connected to a common star point.

10. A vehicle comprising the arrangement of claim 1.

11. An arrangement for providing a vehicle with electric energy, wherein the arrangement comprises a receiving device adapted to receive an alternating electromagnetic field and to produce an alternating electric current by electromagnetic induction, wherein the receiving device comprises a plurality of windings and/or coils of electrically conducting material, wherein each winding or coil is adapted to produce a separate phase of the alternating electric current and wherein a body comprising a ferromagnetic material is arranged above the windings and/or coils, wherein each of the windings and/or coils is connected to an AC/DC converter to produce a direct current and the AC/DC converters are connected in such a manner that the voltages on the DC sides of the converters are added to each other to produce a sum voltage usable for supplying electric energy to a consumer within the vehicle.

12. An arrangement for providing a vehicle with electric energy, wherein the arrangement comprises a receiving device adapted to receive an alternating electromagnetic field and to produce an alternating electric current by electromagnetic induction, wherein the receiving device comprises a plurality of windings and/or coils of electrically conducting material, wherein each winding or coil is adapted to produce a separate phase of the alternating electric current and wherein a body comprising a ferromagnetic material is arranged above the windings and/or coils, wherein terminals of the windings and/or coils are connected—for each winding or coil separately—to a converter for producing a direct current and wherein the converters are electrically connected in parallel to each other so that the direct currents produced by the converters are added to each other for supplying electric energy to a consumer within the vehicle.

13. The arrangement of claim 12, wherein a capacity is connected between the direct current terminals of the converters.

14. The arrangement of claim 13, wherein a switch is connected in parallel to the capacity and wherein the arrangement comprises a control device adapted to automatically close the switch if the capacity is fully loaded with electric energy, thereby shorting the DC side of the converters, and adapted to automatically open the switch if the capacity is able to receive electric energy from the windings and/or coils.

15. A system for transferring electric energy to a vehicle comprising an arrangement that comprises a receiving device adapted to receive an alternating electromagnetic field and to produce an alternating electric current by electromagnetic induction, wherein the receiving device comprises a plurality of windings and/or coils of electrically conducting material, wherein each winding or coil is adapted to produce a separate phase of the alternating electric current and wherein a body comprising a ferromagnetic material is arranged above the windings and/or coils, wherein the arrangement is arranged in the vehicle, and the system further comprises an electric conductor arrangement at the path of travel of the vehicle for producing the alternating electromagnetic field and for thereby transferring the energy to the vehicle, wherein:
   a) the electric conductor arrangement comprises at least two lines for carrying one phase of an alternating electric current,
   b) the lines extend along the path of travel,
   c) the lines are arranged in such a manner that they produce—at each point in time while the alternating electric current is flowing through the lines—a row of successive magnetic poles of an electromagnetic field, wherein the successive magnetic poles have alternating magnetic polarities, and
   d) the row of successive magnetic poles extends in the travel direction of the vehicle which is defined by the path of travel.

16. A system for transferring electric energy to a vehicle comprising an arrangement that comprises a receiving device adapted to receive an alternating electromagnetic field and to produce an alternating electric current by electromagnetic induction, wherein the receiving device comprises a plurality of windings and/or coils of electrically conducting material, wherein each winding or coil is adapted to produce a separate phase of the alternating electric current and wherein a body comprising a ferromagnetic material is arranged above the windings and/or coils, wherein the arrangement is arranged in the vehicle, and the system further comprises an electric conductor arrangement at the path of travel of the vehicle for producing the alternating electromagnetic field and for thereby transferring the energy to the vehicle, wherein:
   a) the electric conductor arrangement comprises at least two lines for carrying one phase of an alternating electric current,
   b) the lines extend along the path of travel,
   c) the lines comprise a plurality of sections which extend transversely to the travel direction of the vehicle which is defined by the path of travel, and
   d) the sections of the same line are arranged in a row along the track in such a manner that—at each point in time while an alternating electric current is flowing through the line—the alternating current flows through successive sections in the row alternatingly in opposite directions.

17. A method for providing a vehicle with electric energy comprising:
   a receiving device of the vehicle receiving an alternating magnetic field which is used to produce an alternating electric current by electromagnetic induction; and
   a plurality of windings and/or coils of electrically conducting material of the receiving device responsive to the alternating magnetic field for producing alternating electric current having a plurality of phases and wherein a body comprising a ferromagnetic material is arranged above the windings and/or coils which are arranged on only one side of the body.

* * * * *